United States Patent
Makida et al.

(10) Patent No.: US 10,676,559 B2
(45) Date of Patent: Jun. 9, 2020

(54) FLAME-RETARDANT URETHANE RESIN COMPOSITION

(71) Applicant: Sekisui Chemical Co., Ltd., Osaka (JP)

(72) Inventors: Taichi Makida, Saitama (JP); Toshitaka Yoshitake, Saitama (JP); Yousuke Okada, Saitama (JP); Takehiko Ushimi, Saitama (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/803,994

(22) Filed: Jul. 20, 2015

(65) Prior Publication Data

US 2015/0322195 A1   Nov. 12, 2015

Related U.S. Application Data

(63) Continuation of application No. PCT/JP2014/000251, filed on Jan. 20, 2014.

(30) Foreign Application Priority Data

| Jan. 20, 2013 | (JP) | ................................. | 2013-007956 |
| Sep. 27, 2013 | (JP) | ................................. | 2013-201596 |

(51) Int. Cl.

| *C08G 18/06* | (2006.01) |
| *C08G 18/09* | (2006.01) |
| *C08G 18/18* | (2006.01) |
| *C08G 18/20* | (2006.01) |
| *C08G 18/22* | (2006.01) |
| *C08G 18/42* | (2006.01) |
| *C08G 18/48* | (2006.01) |
| *C08G 18/76* | (2006.01) |
| *C08J 9/00* | (2006.01) |
| *C08J 9/14* | (2006.01) |
| *C08K 3/02* | (2006.01) |
| *C08K 3/22* | (2006.01) |
| *C08K 3/32* | (2006.01) |
| *C08K 3/38* | (2006.01) |
| *C08K 5/521* | (2006.01) |
| *C08L 75/04* | (2006.01) |
| *C08G 101/00* | (2006.01) |

(52) U.S. Cl.

CPC ............ *C08G 18/06* (2013.01); *C08G 18/092* (2013.01); *C08G 18/18* (2013.01); *C08G 18/1808* (2013.01); *C08G 18/1875* (2013.01); *C08G 18/2027* (2013.01); *C08G 18/225* (2013.01); *C08G 18/4208* (2013.01); *C08G 18/48* (2013.01); *C08G 18/7671* (2013.01); *C08J 9/0038* (2013.01); *C08J 9/0047* (2013.01); *C08J 9/144* (2013.01); *C08K 3/02* (2013.01); *C08K 3/22* (2013.01); *C08K 3/2279* (2013.01); *C08K 3/32* (2013.01); *C08K 3/38* (2013.01); *C08K 5/521* (2013.01); *C08G 2101/00* (2013.01); *C08G 2101/0025* (2013.01); *C08G 2105/02* (2013.01); *C08J 2375/04* (2013.01); *C08K 2003/026* (2013.01); *C08K 2003/2227* (2013.01); *C08K 2003/387* (2013.01)

(58) Field of Classification Search

CPC ........ C08J 9/0038; C08J 9/0047; C08J 9/144; C08J 2375/04; C08G 18/06; C08G 18/092; C08G 18/18; C08G 18/1808; C08G 18/1875; C08G 18/2027; C08G 18/225; C08G 18/48; C08G 18/7671; C08G 2101/00; C08G 2101/0025; C08G 2105/02; C08K 3/32; C08K 3/38

See application file for complete search history.

(56) References Cited

U.S. PATENT DOCUMENTS

| 3,330,783 | A |   | 7/1967 | Piechota et al. | |
| 3,763,057 | A |   | 10/1973 | Diehr et al. | |
| 4,767,795 | A | * | 8/1988 | Adam | ................ C08G 18/5033 |
| | | | | | 252/182.27 |
| 5,177,118 | A |   | 1/1993 | Dueber et al. | |
| 5,272,204 | A | * | 12/1993 | Akimoto | .................. C08F 2/44 |
| | | | | | 521/137 |

(Continued)

FOREIGN PATENT DOCUMENTS

| AU | 1999959328 B2 | * | 6/2000 |
| AU | 199959328 B2 |   | 3/2003 |

(Continued)

OTHER PUBLICATIONS

English-language abstract for CN 1025858148 to Zhou et al. obtained from the European Patent Office dated Feb. 15, 2019.*

(Continued)

Primary Examiner — Melissa A Rioja
(74) Attorney, Agent, or Firm — Osha Liang LLP

(57) ABSTRACT

A flame-retardant urethane resin composition comprises a polyisocyanate compound, a polyol compound, a trimerization catalyst, a foaming agent, a foam stabilizer, and an additive, in which the trimerization catalyst is at least one selected from the group consisting of a nitrogen-containing aromatic compound, a carboxylic acid alkali metal salt, a tertiary ammonium salt, and a quaternary ammonium salt, and the additive comprises red phosphorus and at least one selected from the group consisting of a phosphoric acid ester, a phosphate-containing flame retardant, a bromine-containing flame retardant, a boron-containing flame retardant, an antimony-containing flame retardant, and a metal hydroxide.

8 Claims, No Drawings

(56) References Cited

U.S. PATENT DOCUMENTS

| | | | |
|---|---|---|---|
| 5,565,600 A * | 10/1996 | Elnagar | C07F 9/65748 558/74 |
| 5,670,553 A | 9/1997 | Mackey | |
| 2003/0153656 A1 | 8/2003 | Sjerps | |
| 2012/0035289 A1 | 2/2012 | Tokumoto et al. | |
| 2015/0126690 A1 | 5/2015 | Gan | |

FOREIGN PATENT DOCUMENTS

| | | | |
|---|---|---|---|
| CN | 101180352 A | 5/2008 | |
| CN | 102585148 A | 7/2012 | |
| JP | S4113154 Y1 | 6/1966 | |
| JP | S47008544 A | 5/1972 | |
| JP | S57036114 A | 2/1982 | |
| JP | S61-261331 A | 11/1986 | |
| JP | H03-152159 A | 6/1991 | |
| JP | H09-169863 A | 6/1997 | |
| JP | H09-169887 A | 6/1997 | |
| JP | H10-147623 A | 6/1998 | |
| JP | H10-168150 A | 6/1998 | |
| JP | H11-512125 A | 10/1999 | |
| JP | 2001-030431 A | 2/2001 | |
| JP | 2001-200027 A | 7/2001 | |
| JP | 2002-338651 A | 11/2002 | |
| JP | 2003064209 A | 3/2003 | |
| JP | 2004-050495 A | 2/2004 | |
| JP | 2004123972 A | 4/2004 | |
| JP | 2005-500417 A | 1/2005 | |
| JP | 2006321882 A | 11/2006 | |
| JP | 3950980 B2 | 8/2007 | |
| JP | 2008-501063 A | 1/2008 | |
| JP | 2008088356 A | 4/2008 | |
| JP | 2009-187885 A | 8/2009 | |
| JP | 2010007079 A | 1/2010 | |
| JP | 2010-053267 A | 3/2010 | |
| JP | 2011-016854 A | 1/2011 | |
| JP | 2011190438 A | 9/2011 | |
| JP | 2015063675 A | 4/2015 | |
| WO | 2006043435 A1 | 4/2006 | |
| WO | 2006104767 A1 | 10/2006 | |
| WO | 2012/067841 A2 | 5/2012 | |
| WO | 2014112394 A1 | 7/2014 | |
| WO | 2015004928 A1 | 1/2015 | |

OTHER PUBLICATIONS

Machine translation of CN 1025858148 to Zhou et al. obtained from the European Patent Office dated Feb. 15, 2019.*

International Search Report issued in corresponding International Application No. PCT/JP2014/000251 dated Feb. 10, 2014, and English translation thereof (5 pages).

Office Action issued in Japanese Application No. 2014-557418; dated Jul. 28, 2016 (7 pages).

Boguslaw Czuprynski et al: "Properties of Rigid Polyurethane-Polyisocyanurate Foams Modified with the Selected Fillers", Journal of Applied Polymer Science, vol. 115, No. 4, Feb. 15, 2010, pp. 2460-2469, XP055292309, US ISSN: 0021-8995, DOI: 10. 1002/app.30937.

Extended European Search Report issued in European Application No. 14740252.3; dated Aug. 11, 2016 (9 pages).

Office Action issued in corresponding Japanese Application No. 20140557418 with English translation dated Jan. 17, 2017 (6 pages).

First Office Action dated Mar. 14, 2017, by the State Intellectual Property Office of The People People's Republic of China in corresponding Chinese Patent Application No. CN-201480004305.8, with English translation (10 pages).

Second Office Action dated Sep. 19, 2017, issued by the State Intellectual Property Office of Peoples Republic of China in corresponding Chinese Patent Application No. 201480004305.8, with English translation [and Global Dossier printout dated Nov. 15, 2017, confirming the date of the Second Office Action] (13 pages).

Examination Report issued in European application No. 14740252.3; dated Jul. 5, 2018 (5 pages).

A. Zhang et al., "Preparation and Characterization of excellent flame retarded rigid polyurethane foams," Advanced Materials Research, vols. 374-377, pp. 1563-1566, Oct. 24, 2011 (4 pages).

"Q&A on fire and disaster prevention of rigid polyurethane foam (Exhibit A16)," Japan Urethane Industries Institute, Second Edition, May 2009 (5 pages).

"Performance enchancement techniques for flame retardant polymer materials (Exhibit A17)," CMC Publishing Co., Ltd., Jun. 20, 2002 (7 pages) with partial English translation.

"[New] Flame retardants/Flame retardancy technique-Proceedings and latest patent information (Exhibit A18)," Technical Information Institute Co., Ltd., Jul. 31, 2008 (6 pages) with partial English translation.

S. Sato et al., "Flame retardancy of rigid urethane foam (Exhibit A19)," The Journal of Chemical Industry, vol. 70, No. 9 Feb. 25, 1967 (8 pages) with partial English translation.

Opposition #2018-700937-01 filed by Ms. Misonoo dated Nov. 22, 2018 (95 pages).

Opposition #2018-700937-02 filed by Mr. Honma dated Nov. 22, 2018 (140 pages).

Opposition #2019-700724 filed by Mr. Honma dated Sep. 12, 2019 (165 pages).

* cited by examiner

FLAME-RETARDANT URETHANE RESIN COMPOSITION

BACKGROUND ART

Concrete has an advantage of maintaining strength over a long period of time as a constructional material.

However, in a hot season such as summer, heat accumulates in the concrete due to the outside air, direct sun rays, etc., and thus the inside of a building is heated by the accumulated heat. In addition, in winter, the concrete cools the inside of a building.

Accordingly, insulation processing is usually performed on the concrete. For example, an insulating layer is formed by spraying hard polyurethane foam onto the surface of the concrete such as a rebar-reinforced concrete used in multiple dwelling houses such as apartments.

However, if the insulating layer is formed simply by spraying the hard polyurethane foam, the hard, polyurethane foam can burn easily in case of a fire in the building. Therefore, polyurethane foams that have a self-extinguishable or flame retardant property have been developed and are described, for example, in Patent Literatures 1 to 12.

CITATION LIST

Patent Literature

[Patent Literature 1] JP-A-9-169863
[Patent Literature 2] JP-A-2010-053267
[Patent Literature 3] JP-A-2004-050495
[Patent Literature 4] JP-A-2002-338651
[Patent Literature 5] JP-A-3-152159
[Patent Literature 6] JP-A-61-261331
[Patent Literature 7] JP-A-2001-200027
[Patent Literature 8] JP-A-2010-7079
[Patent Literature 9] JP-A-2005-500417
[Patent Literature 10] JP-A-2009-187885
[Patent Literature 11] JP-A-2008-501063
[Patent Literature 12] JP-T-11-512125

SUMMARY OF THE INVENTION

One or more embodiments of the present disclosure provide a flame-retardant urethane resin composition capable of forming foam that can be handled easily, has excellent flame retardancy, and maintains a constant shape when being heated.

The present inventors conducted intensive research, and as a result, they found that a flame-retardant urethane resin composition containing a polyisocyanate compound, a polyol compound, a trimerization catalyst, a foaming agent, a foam stabilizer, and an additive which contains red phosphorus as an essential component may be used in embodiments according to the disclosure.

One or more aspects of the present disclosure provide a flame-retardant urethane, resin composition comprising: a polyisocyanate compound; a polyol compound; a trimerization catalyst; a foaming agent; a foam stabilizer; and an additive, wherein the trimerization catalyst is at least one selected from the group consisting of a nitrogen-containing aromatic compound, a carboxylic acid alkali metal salt, a tertiary ammonium salt, and a quaternary ammonium salt, and the additive comprises red phosphorus and at least one selected from the group consisting of a phosphoric acid ester, a phosphate-containing flame retardant, a bromine-containing flame retardant, a boron-containing flame retardant, an antimony-containing flame retardant, and a metal hydroxide.

One or more aspects of the present disclosure provide foam obtained by molding the flame-retardant urethane resin composition.

One or more aspects of the present disclosure provide a covered flame-retardant structure obtained by covering a structure with the flame-retardant urethane resin composition.

One or more aspects of the present disclosure provide a method for producing a flame-retardant urethane resin composition comprises: preparing an additive by mixing red phosphorus and at least one selected from the group consisting of a phosphoric acid ester, a phosphate-containing flame retardant, a bromine-containing flame retardant, a boron-containing flame retardant, an antimony-containing flame retardant, and a metal hydroxide; preparing a mixture by mixing a polyol compound, a trimerization catalyst, a forming agent, a foam stabilizer, and the additive; and adding a polyisocyanate compound into the mixture, wherein the trimerization catalyst is at least one selected from the group consisting of a nitrogen-containing aromatic compound, a carboxylic acid alkali metal salt, a tertiary ammonium salt, and a quaternary ammonium salt.

According to one or more embodiments of the present disclosure, it is possible to provide a flame-retardant urethane resin composition capable of forming foam that can be handled easily, has excellent flame retardancy, and maintains a constant shape when being heated.

DETAILED DESCRIPTION OF EMBODIMENTS

A flame-retardant urethane resin composition according to one or more embodiments of the present disclosure will be described.

First, a urethane resin used in the flame-retardant urethane resin composition will be described.

The urethane resin is composed of a polyisocyanate compound as a main agent and a polyol compound as a curing agent.

Examples of the polyisocyanate compound as a main agent of the urethane resin include an aromatic polyisocyanate, an alicyclic polyisocyanate, an aliphatic polyisocyanate, and the like.

Examples of the aromatic polyisocyanate include phenylene diisocyanate, tolylene diisocyanate, xylylene diisocyanate, diphenylmethane diisocyanate, dimethyl diphenylmethane diisocyanate, triphenylmethane triisocyanate, naphthalene diisocyanate, polymethylene polyphenyl polyisocyanate, and the like.

Examples of the alicyclic polyisocyanate include cyclohexylene diisocyanate, methyl cyclohexylene diisocyanate, isophorone diisocyanate, dicyclohexylmethane diisocyanate, dimethyl dicyclohexylmethane diisocyanate, and the like.

Examples of the aliphatic polyisocyanate include methylene diisocyanate, ethylene diisocyanate, propylene diisocyanate, tetramethylene diisocyanate, hexamethylene diisocyanate, and the like.

One kind of the polyisocyanate compound or two or more kinds thereof can be used.

As the main agent of the urethane resin used in one or more embodiments of the present disclosure, diphenylmethane diisocyanate is preferable because it is easy to use and easily available.

Examples of the polyol compound as a curing agent of the urethane resin include polylactone polyol, polycarbonate polyol, aromatic polyol, alicyclic polyol, aliphatic polyol, polyester polyol, polymer polyol, polyether polyol, and the like.

Examples of the polylactone polyol include polypropiolactone glycol, polycaprolactone glycol, polyvalerolactone glycol, and the like.

Examples of the polycarbonate polyol include polyols obtained by a dealcoholization reaction between a hydroxyl group-containing compound, such as ethylene glycol, propylene glycol, butanediol, pentanediol, hexanediol, octanediol, or nonanediol, and diethylene carbonate, dipropylene carbonate, or the like.

Examples of the aromatic polyol include bisphenol A, bisphenol F, phenol novolac, cresol novolac, and the like.

Examples of the alicyclic polyol include cyclohexanediol, methyl cyclohexanediol, isophorone diol, dicyclohexyl methanediol, dimethyl dicyclohexyl methanediol, and the like.

Examples of the aliphatic polyol include ethylene glycol, propylene glycol, butanediol, pentanediol, hexanediol, and the like.

Examples of the polyester polyol include a polymer obtained by dehydration condensation of a polybasic acid and a polyhydric alcohol, a polymer obtained by ring opening polymerization of a lactone such as ε-caprolactone or α-methyl-ε-caprolactone, and a condensate of a hydroxycarboxylic acid, the aforementioned polyhydric alcohol, and the like.

Examples of the polybasic acid specifically include adipic acid, azelaic acid, sebacic acid, terephthalic acid, isophthalic acid, succinic acid, and the like.

Examples of the polyhydric alcohol specifically include bisphenol A, ethylene glycol, 1,2-propylene glycol, 1,4-butanediol, diethylene glycol, 1,6-hexane glycol, neopentyl glycol, and the like.

Examples of the hydroxycarboxylic acid specifically include castor oil, a reaction product from castor oil and ethylene glycol, and the like.

Examples of the polymer polyol include polymers obtained by graft-polymerizing the aforementioned aromatic polyol, alicyclic polyol, aliphatic polyol, polyester polyol, or the like with an ethylenically unsaturated compound such as acrylonitrile, styrene, methyl acrylate, or methacrylate, polybutadiene polyol, modified polyol of a polyhydric alcohol, hydrogenated substances of these, and the like.

Examples of the modified polyol of a polyhydric alcohol include those obtained by modifying the polyhydric alcohol as a raw material by reacting the polyhydric alcohol with an alkylene oxide.

Examples of the polyhydric alcohol include a trihydric alcohol such as glycerin and trimethylolpropane; alcohols having 4 to 8 hydroxyl groups such as pentaerythritol, sorbitol, mannitol, sorbitan, diglycerin, dipentaerythritol, sucrose, glucose, mannose, fructose, methyl glucoside, derivatives of these; phenols such as phenol, phloroglucin, cresol, pyrogallol, catechol, hydroquinone, bisphenol A, bisphenol F, bisphenol S, 1-hydroxynaphthalene, 1,3,6,8-tetrahydroxynaphthalene, anthrol, 1,4,5,8-tetrahydroxyanthracene, and 1-hydroxypyrene; polybutadiene polyol; castor oil polyol; polyfunctional polyols (for example, having 2 to 100 functional groups) such as a (co)polymer of hydroxyalkyl (meth)acrylate and polyvinyl alcohol; and a condensate (novolac) of phenol and formaldehyde.

The method for modifying the polyhydric alcohol is not particularly limited. However, a method of adding alkylene oxide (hereinafter, abbreviated to AO) to the polyhydric alcohol is preferably used.

Examples of the AO include an AO having 2 to 6 carbon atoms, such as ethylene oxide (hereinafter, abbreviated to EO), 1,2-propylene oxide (hereinafter, abbreviated to PO), 1,3-propylene oxide, 1,2-butylene oxide, and 1,4-butylene oxide.

Among these, from the viewpoint of the properties and reactivity, PO, EO, and 1,2-butylene oxide are preferable, and PO and EO are more preferable.

When two or more kinds of AO (for example, PO and EO) are used, they may be added to the polyhydric alcohol by a method in which they are added in the form of a block copolymer or a random copolymer. Alternatively, a block copolymer and a random copolymer may be concurrently used.

Examples of the polyether polyol include a polymer which is obtained by performing ring-opening polymerization of at least one kind of alkylene oxide such as ethylene oxide, propylene oxide, or tetrahydrofuran in the presence of at least one kind of compound such as a low-molecular weight active hydrogen compound having 2 or more active hydrogen atoms.

Examples of the low-molecular weight active hydrogen compound having 2 or more active hydrogen atoms include diols such as bisphenol A, ethylene glycol, propylene glycol, butylene glycol, and 1,6-hexanediol; triols such as glycerin and trimethylolpropane; amines such as ethylenediamine and butylenediamine; and the like.

In one or more embodiments of the present disclosure, it is preferable to use polyester polyol or polyether polyol as the polyol because they exert a strong effect of reducing a gross calorific value at the time of combustion.

Particularly, a polyester polyol having a molecular weight of 200 to 800 is preferably used, and a polyester polyol having a molecular weight of 300 to 500 is more preferably used.

An isocyanate index is a measure determined by expressing an equivalent ratio of an isocyanate group of a polyisocyanate compound to a hydroxyl group of a polyol compound by a percentage. If a value of the index is greater than 100, this means that the amount of the isocyanate group is greater than the amount of the hydroxyl group.

The isocyanate index of the urethane resin used in one or more embodiments of the present disclosure is preferably within a range of 120 to 1,000, more preferably within a range of 200 to 800, and even more preferably within a range of 300 to 600.

The flame-retardant urethane resin composition according to one or more embodiments of the present disclosure further contains a catalyst, a foam stabilizer, and a foaming agent.

Examples of the catalyst include triethylamine, N-methylmorpholine bis(2-dimethylaminoethyl)ether, N,N,N',N'',N''-pentamethyl diethylenetriamine, N,N,N'-trimethylaminoethyl ethanolamine, bis(2-dimethylaminoethyl)ether, N-methyl,N'-dimethylaminoethyl piperazine, a nitrogen atom-containing catalyst such as an imidazole compound obtained by substituting a secondary amine functional group in an imidazole ring with a cyanoethyl group, and the like.

The amount of the catalyst added to the flame-retardant urethane resin composition according to one or more embodiments of the present disclosure is preferably within a range of 0.6 parts by weight to 10 parts by weight, more preferably within a range of 0.6 parts by weight to 8 parts by weight, even more preferably within a range of 0.6 parts by weight to 6 parts by weight, and most preferably within a range of 0.6 parts by weight to 3.0 parts by weight, with respect to 100 parts by weight of the urethane resin.

In selected embodiments, the catalyst added is equal to or greater than 0.6 parts by weight to equal to or less than 10 parts by weight. An appropriate foaming rate can be maintained, and thus the foam is handled easily.

The catalyst used in one or more embodiments of the present disclosure includes a trimerization catalyst that accelerates the generation of an isocyanurate ring by reacting and trimerizing the isocyanate group contained in the polyisocyanate compound as a main agent of a polyurethane resin.

In order to accelerate the generation of an isocyanurate ring, it is possible to use a catalyst like a nitrogen-containing aromatic compound such as tris(dimethylaminomethyl)phenol, 2,4-bis(dimethylaminomethyl)phenol, or 2,4,6-tris(dialkylaminoalkyl)hexahydro-s-triazine; a carboxylic acid alkali metal salt such as potassium acetate, potassium 2-ethylhexanoate, or potassium octylate; a tertiary ammonium salt such as a trimethyl ammonium salt, a triethyl ammonium salt, or a triphenyl ammonium salt; a quaternary ammonium salt such as a tetramethyl ammonium salt, tetraethyl ammonium salt, or a tetraphenyl ammonium salt; and the like.

The amount of the trimerization catalyst added to the flame-retardant urethane resin composition according to one or more embodiments of the present disclosure is preferably within a range of 0.6 parts by weight to 10 parts by weight, more preferably within a range of 0.6 by weight to 8 parts by weight, even more preferably within a range of 0.6 parts by weight to 6 parts by weight, and most preferably within a range of 0.6 parts by weight to 3.0 parts by weight, with respect to 100 parts by weight of the urethane resin.

In selected embodiments, the trimerization catalyst added is equal to or greater than 0.6 parts by weight to equal to or less than 10 parts by weight. An appropriate foaming rate can be maintained, and thus the foam is handled easily.

The foaming agent used in the flame-retardant urethane resin composition according to one or more embodiments of the present disclosure accelerates foaming of the urethane resin.

Specific examples of the foaming agent include water, low-boiling point hydrocarbons such as propane, butane, pentane, hexane, heptane, cyclopropane, cyclobutane, cyclopentane, cyclohexane, and cycloheptane; chlorinated aliphatic hydrocarbon compounds such as dichloroethane, propyl chloride, isopropyl chloride, butyl chloride, isobutyl chloride, pentyl chloride, and isopentyl chloride; fluorine compounds such as trichloromonofluoromethane and trichlorotrifluoroethane; hydrofluorocarbons such as $CHF_3$, $CH_2F_2$, and $CH_3F$; hydrochlorofluorocarbon compounds such as dichloromonofluoroethane (for example, HCFC141b (1,1-dichloro-1-fluoroethane), HCFC22 (chlorodifluoromethane), or HCFC142b (1-chloro-1,1-difluoroethane)), HFC-245fa (1,1,1,3,3-pentafluoropropane), and HFC-365mfc (1,1,1,3,3-pentafluorobutane); an ether compound such as diisopropylether; an organic physical foaming agent such as a mixture of the above compounds; an inorganic physical foaming agent such as nitrogen gas, oxygen gas, argon gas, or carbon dioxide gas; and the like.

The amount of the foaming agent used in the flame-retardant urethane resin composition according to one or more embodiments of the present disclosure is preferably within a range of 0.1 parts by weight to 30 parts by weight with respect to 100 parts by weight of the urethane resin.

The amount of the foaming agent is more preferably within a range of 0.1 parts by weight to 18 parts by weight, even more preferably within a range of 0.5 parts by weight to 18 parts by weight, and most preferably within a range of 1 part by weight to 10 parts by weight, with respect to 100 parts by weight of the urethane resin.

In selected embodiments, if the amount of water is within a range of equal to or greater than 0.1 parts by weight, foaming is accelerated, and the density of the obtained molded article can be reduced. In selected embodiments, if the amount of water is equal to or less than 30 parts by weight, foam does not burst, and it is possible to prevent foam from not being formed.

The flame-retardant urethane resin composition according to one or more embodiments of the present disclosure contains a foam stabilizer.

Examples of the foam stabilizer include surfactants like a polyoxyalkylene foam stabilizer such as polyoxyalkylene alkyl ether and a silicone foam stabilizer such as organopolysiloxane, and the like.

The amount of the foam stabilizer used with respect to the urethane resin cured by the chemical reaction is appropriately determined depending on the urethane resin cured by the chemical reaction used. However, for example, the amount of the foam stabilizer used is preferably within a range of 0.1 parts by weight to 10 parts by weight with respect to 100 parts by weight of the urethane resin.

One kind of each of the catalyst, the foaming agent, and the foam stabilizer can be used, or two or more kinds thereof can be used.

Next, an additive used in one or more embodiments of the present disclosure will be described.

The flame-retardant urethane resin composition according to one or more embodiments of the present disclosure contains an additive.

The additive is obtained by combining red phosphorus as an essential component with at least one kind selected from the group consisting of a phosphoric acid ester, a phosphate-containing flame retardant, a bromine-containing flame retardant, a boron-containing flame retardant, an antimony-containing flame retardant, and a metal hydroxide other than the red phosphorus.

The red phosphorus used in one or more embodiments of the present disclosure is not limited, and a commercially available product can be appropriately selected and used.

The amount of red phosphorus added that is used in the flame-retardant urethane resin composition according to one or more embodiments of the present disclosure is preferably within a range of 3.0 parts by weight to 18 parts by weight with respect to 100 parts by weight of the urethane resin.

In selected embodiments, If the amount of red phosphorus added is within a range of equal to or greater than 3.0 parts by weight, the self-extinguishability of the flame-retardant urethane resin composition according to one or more embodiments of the present disclosure is maintained, and if it is equal to or less than 18 parts by weight, foaming of the flame-retardant urethane resin composition according to one or more embodiments of the present disclosure is not hindered.

The phosphoric acid ester used in one or more embodiments of the present disclosure is not particularly limited. However, it is preferable to use a monophosphoric acid ester, a condensed phosphoric acid ester, and the like.

The monophosphoric acid ester is not particularly limited, and examples thereof include trimethyl phosphate, triethyl phosphate, tributyl phosphate, tris(2-ethylhexyl)phosphate, tributoxyethyl phosphate, triphenyl phosphate, tricresyl phosphate, trixylenyl phosphate, tris(isopropylphenyl)phosphate, tris(phenylphenyl)phosphate, trinaphthyl phosphate, cresyl diphenyl phosphate, xylenyl diphenyl phosphate, diphenyl(2-ethylhexyl) phosphate, di(isopropylphenyl)phenyl phosphate, monoisodecyl phosphate, 2-acryloyloxyethyl acid phosphate, 2-methacryloyloxyethyl acid phosphate, diphenyl-2-acryloyloxyethyl phosphate, diphenyl-2-acryloyloxyethyl phosphate, diphenyl-2-methacryloyloxyethyl phosphate, melamine phosphate, dimelamine phosphate, melamine pyrophosphate, triphenylphosphine oxide, tricresylphosphine oxide, diphenyl methanephosphonate, diethyl phenylphosphonate, resorcinol bis(diphenylphosphate), bisphenol A bis(diphenylphosphate), phosphaphenanthrene, tris(β-chloropropyl)phosphate, and the like.

The condensed phosphoric acid ester is not particularly limited, and examples thereof include condensed phosphoric acid esters such as trialkyl polyphosphate, resorcinol polyphenyl phosphate, resorcinol poly(di-2,6-xylyl)phosphate (manufactured by DAIHACHI CHEMICAL INDUSTRY CO., LTD., trade name: PX-200), hydroquinone poly(2,6-xylyl)phosphate, and a condensate of these.

Examples of commercially available condensed phosphoric acid esters include resorcinol polyphenyl phosphate (manufactured by ADEKA CORPORATION, trade name: CR-733S), bisphenol A polycresyl phosphate (manufactured by ADEKA CORPORATION, trade name: CR-741), an aromatic condensed phosphoric acid ester (manufactured by ADEKA CORPORATION, trade name: CR747), resorcinol polyphenyl phosphate (manufactured by ADEKA CORPORATION, trade name: Adekastab PFR), bisphenol A polycresyl phosphate (manufactured by ADEKA CORPORATION, trade name: FP-600, EP-700, and the like.

Among the above, a monophosphoric acid ester is preferably used because it has a strong effect of reducing viscosity of the composition having not yet been cured and a strong effect of reducing an initial calorific value, and tris(β-chloropropyl)phosphate is more preferably used.

One kind of the phosphoric acid ester or two or more kinds thereof can be used.

The amount of the phosphoric acid ester added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the phosphoric acid ester added is within a range of equal to or greater than 1.5 parts by weight, the molded article formed of the flame-retardant urethane resin composition according to one or more embodiments of the present disclosure can prevent dense residues formed by heat resulting from fire from cracking. If the amount of the phosphoric acid ester added is within a range of equal to or less than 52 parts by weight, foaming of the flame-retardant urethane resin composition according to one or more embodiments of the present disclosure is not hindered.

The phosphate-containing flame retardant used in one or more embodiments of the present disclosure contains phosphoric acid.

The phosphoric acid used in the phosphate-containing flame retardant is not particularly limited, and examples thereof include various phosphoric acids such as monophosphoric acid, pyrophosphoric acid, and polyphosphoric acid.

Examples of the phosphate-containing flame retardant include phosphates composed of a salt of the aforementioned various phosphoric acids and at least one kind of metal or compound selected from among metals of groups IA to IVB in the periodic table, ammonia, an aliphatic amine, and an aromatic amine.

Examples of the metal of groups IA to IVB in the periodic table include lithium, sodium, calcium, barium, iron(II), iron(III), aluminum, and the like.

Examples of the aliphatic amine include methylamine, ethylamine, diethylamine, triethylamine, ethylenediamine, piperazine, and the like.

Examples of the aromatic amine include pyridine, triazine, melamine, ammonium, and the like.

The phosphate-containing flame retardant may be treated by a known method so as to improve waterproofing properties thereof, such as being treated with a silane coupling agent or being covered with a melamine resin. Furthermore, a known foaming adjuvant such as melamine or pentaerythritol may be added thereto.

Specific examples of the phosphate-containing flame retardant include a monophosphate, a pyrophosphate, a polyphosphate, and the like.

The monophosphate is not particularly limited, and examples thereof include an ammonium salt such as ammonium phosphate, ammonium dihydrogen phosphate, or diammonium hydrogen phosphate; a sodium salt such as monosodium phosphate, disodium phosphate, trisodium phosphate, monosodium phosphite, disodium phosphite, or sodium hypophosphite; a potassium salt such as monopotassium phosphate, dipotassium phosphate, tripotassium phosphate, monopotassium phosphite, dipotassium phosphite, or potassium hypophosphite; a lithium salt such as monolithium phosphate, dilithium phosphate, trilithium phosphate, monolithium phosphite, dilithium phosphite, or lithium hypophosphite; a barium salt such as barium dihydrogen phosphate, barium hydrogen phosphate, tribarium phosphate, or barium hypophosphite; a magnesium salt such as magnesium dihydrogen phosphate, magnesium hydrogen phosphate, trimagnesium phosphate, or magnesium hypophosphite; a calcium salt such as calcium dihydrogen phosphate, calcium hydrogen phosphate, tricalcium phosphate, or calcium hypophosphite; a zinc salt such as zinc phosphate, zinc phosphite, or zinc hypophosphite; and the like.

The polyphosphate is not particularly limited, and examples thereof include ammonium polyphosphate, piperazine polyphosphate, melamine polyphosphate, ammonium amide polyphosphate, aluminum polyphosphate, and the like.

Among these, a monophosphate is preferably used, and ammonium dihydrogen phosphate is more preferably used, because the self-extinguishability of the phosphate-containing flame retardant is improved.

One kind of the phosphate-containing flame retardant or two or more kinds thereof can be used.

The amount of the phosphate-containing flame retardant added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the phosphate-containing flame retardant added is within a range of equal to or greater than 1.5 parts by weight, the self-extinguishability of the flame-retardant urethane resin composition according to one or more embodiments of the present disclosure is maintained, and if it is equal to or less than 52 parts by weight, foaming of the flame-retardant urethane resin composition according to one or more embodiments of the present disclosure is not hindered.

The bromine-containing flame retardant used in one or more embodiments of the present disclosure is not particularly limited as long as it is a compound containing bromine in a molecular structure thereof. Examples thereof include an aromatic brominated compound and the like.

Specific examples of the aromatic brominated compound include a monomeric organic bromine compound such as hexabromobenzene, pentabromotoluene, hexabromobiphenyl, decabromobiphenyl, hexabromocyclodecane, decabromodiphenylether, octabromodiphenylether, hexabromodiphenylether, bis(pentabromophenoxy)ethane, ethylene bis(tetrabromophthalimide), and tetrabromobisphenol A; a brominated polycarbonate such as a polycarbonate oligomer manufactured by using brominated bisphenol A as a raw material and a copolymer of the polycarbonate oligomer and bisphenol A; brominated epoxy compounds such as a diepoxy compound manufactured by a reaction between brominated bisphenol A and epichlorohydrin and a monoepoxy compound obtained by a reaction between brominated phenols and epichlorohydrin; poly(brominated benzyl acrylate); brominated polyphenylene ether; a condensate of brominated bisphenol A, cyanuric chloride, and brominated phenol; brominated polystyrene such as brominated (polystyrene), poly(brominated styrene), and crosslinked brominated polystyrene; and a halogenated bromine compound polymer such as crosslinked or non-crosslinked brominated poly(methylstyrene).

From the viewpoint of controlling the calorific value at the initial stage of combustion, brominated polystyrene, hexabromobenzene, and the like are preferable, and hexabromobenzene is more preferable.

One kind of the bromine-containing flame retardant or two or more kinds thereof can be used.

The amount of the bromine-containing flame retardant added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the bromine-containing flame retardant added is within a range of equal to or greater than 0.1 parts by weight, the self-extinguishability of the flame-retardant urethane resin composition according to one or more embodiments of the present disclosure is maintained, and if it is equal to or less than 52 parts by weight, foaming of the flame-retardant urethane resin composition according to one or more embodiments of the present disclosure is not hindered.

Examples of the boron-containing flame retardant used in one or more embodiments of the present disclosure include borax, boron oxide, boric acid, borate, and the like.

Examples of the boron oxide include diboron trioxide, boron trioxide, diboron dioxide, tetraboron trioxide, tetraboron pentoxide, and the like.

Examples of the borate include a borate of an alkali metal, a borate of an alkaline earth metal, a borate of an element of group 4, group 12, or group 13 in the periodic table, a borate of ammonium, and the like.

Specifically, examples of the borate include an alkali metal salt borate such as lithium borate, sodium borate, potassium borate, and cesium borate; an alkaline earth metal salt borate such as magnesium borate, calcium borate, and barium borate; zirconium borate; zinc borate; aluminum borate; ammonium borate; and the like.

The boron-containing flame retardant used in one or more embodiments of the present disclosure is preferably a borate and more preferably zinc borate.

One kind of the boron-containing flame retardant or two or more kinds thereof can be used.

The amount of the boron-containing flame retardant added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the boron-containing flame retardant added is within a range of equal to or greater than 1.5 parts by weight, the self-extinguishability of the flame-retardant urethane resin composition according to one or more embodiments of the present disclosure is maintained, and if it is equal to or less than 52 parts by weight, foaming of the flame-retardant urethane resin composition according to one or more embodiments of the present disclosure is not hindered.

Examples of the antimony-containing flame retardant used in one or more embodiments of the present disclosure include antimony oxide, an antimonate, a pyroantimonate, and the like.

Examples of the antimony oxide include antimony trioxide, antimony pentoxide, and the like.

Examples of the antimonate include sodium antimonate, potassium antimonate, and the like.

Examples of the pyroantimonate include sodium pyroantimonate, potassium pyroantimonate, and the like.

The antimony-containing flame retardant used in one or more embodiments of the present disclosure is preferably antimony oxide.

One kind of the antimony-containing flame retardant or two or more kinds thereof can be used.

The amount of the antimony-containing flame retardant added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the antimony-containing flame retardant added is within a range of equal to or greater than 1.5 parts by weight, the self-extinguishability of the flame-retardant urethane resin composition according to one or more embodiments of the present disclosure is maintained, and if it is equal to or less than 52 parts by weight, foaming of the flame-retardant urethane resin composition according to one or more embodiments of the present disclosure is not hindered.

Examples of the metal hydroxide used in one or more embodiments of the present disclosure include magnesium hydroxide, calcium hydroxide, aluminum hydroxide, iron hydroxide, nickel hydroxide, zirconium hydroxide, titanium hydroxide, zinc hydroxide, copper hydroxide, vanadium hydroxide, tin hydroxide, and the like.

One kind of the metal hydroxide or two or more kinds thereof can be used.

The amount of the metal hydroxide added that is used in one or more embodiments of the present disclosure is preferably within a range of 1.5 parts by weight to 52 parts by weight, more preferably within a range of 1.5 parts by weight to 20 parts by weight, even more preferably within a range of 2.0 parts by weight to 15 parts by weight, and most preferably within a range of 2.0 parts by weight to 10 parts by weight, with respect to 100 parts by weight of the urethane resin.

If the amount of the metal hydroxide added is within a range of equal to or greater than 1.5 parts by weight, the self-extinguishability of the flame-retardant urethane resin composition according to one or more embodiments of the present disclosure is maintained, and if it is equal to or less than 52 parts by weight, foaming of the flame-retardant urethane resin composition according to one or more embodiments of the present disclosure is not hindered.

The flame-retardant urethane resin composition according to one or more embodiments of the present disclosure can also contain an inorganic filler.

The inorganic filler is not particularly limited, and examples thereof include silica, diatomite, alumina, titanium oxide, calcium oxide, magnesium oxide, iron oxide, tin oxide, antimony oxide, ferrites, basic magnesium carbonate, calcium carbonate, magnesium carbonate, zinc carbonate, barium carbonate, dawsonite, hydrotalcite, calcium sulfate, barium sulfate, gypsum fiber, a calcium salt such as calcium silicate, talc, clay, mica, montmorillonite, bentonite, activated white earth, sepiolite, imogolite, sericite, glass fibers, glass beads, a silica balloon, aluminum nitride, boron nitride, silicon nitride, carbon black, graphite, carbon fibers, a carbon balloon, charcoal powder, various metal powders, potassium titanate, magnesium sulfate, lead zirconate titanate, aluminum borate, molybdenum sulfide, silicon carbide, stainless steel fibers, various magnetic powders, slag fibers, fly ash, silica alumina fibers, alumina fibers, silica fibers, zirconia fibers, and the like.

One kind of the inorganic filler or two or more kinds thereof can be used.

If necessary, the flame-retardant urethane resin composition according to one or more embodiments of the present disclosure can contain an additive such as an antioxidant based on phenol, amine, or sulfur, a light stabilizer, a metal deterioration inhibitor, an antistatic agent, a stabilizer, a crosslinking agent, a lubricant, a softener, a pigment, or a tackifying resin and an adhesiveness imparting agent such as polybutene or a petroleum resin, within a range that does not impair the object of the present disclosure.

The additive used in one or more embodiments of the present disclosure is obtained by combining red phosphorus as an essential component with at least one kind selected from the group consisting of the phosphoric acid ester, the phosphate-containing flame retardant, the bromine-containing flame retardant, the boron-containing flame retardant, the antimony-containing flame retardant, and the metal hydroxide other than the red phosphorus.

Examples of a preferred combination for the additive used in one or more embodiments of the present disclosure include any of the following (a) to (n).

(a) Red phosphorus and phosphoric acid ester
(b) Red phosphorus and phosphate-containing flame retardant
(c) Red phosphorus and bromine-containing flame retardant
(d) Red phosphorus and boron-containing flame retardant
(e) Red phosphorus and antimony-containing flame retardant
(f) Red phosphorus and metal hydroxide
(g) Red phosphorus, phosphoric acid ester, and phosphate-containing flame retardant
(h) Red phosphorus, phosphoric acid ester, and bromine-containing flame retardant
(i) Red phosphorus, phosphoric acid ester, and boron-containing flame retardant
(j) Red phosphorus, phosphate-containing flame retardant, and bromine-containing flame retardant
(k) Red phosphorus, phosphate-containing flame retardant, and boron-containing flame retardant
(l) Red phosphorus, bromine-containing flame retardant, and boron-containing flame retardant
(m) Red phosphorus, phosphoric acid ester, phosphate-containing flame retardant, and bromine-containing flame retardant
(n) Red phosphorus, phosphoric acid ester, phosphate-containing flame retardant, bromine-containing flame retardant, and boron-containing flame retardant The total amount of the added additive other than the urethane resin that is used in one or more embodiments of the present disclosure is preferably within a range of 4.5 parts by weight to 70 parts by weight, more preferably within a range of 4.5 parts by weight to 40 parts by weight, even more preferably within a range of 4.5 parts by weight to 30 parts by weight, and most preferably within a range of 4.5 parts by weight to 20 parts by weight, with respect to 100 parts by weight of the urethane resin.

If the amount of the additive added is within a range of equal to or greater than 4.5 parts by weight, the molded article formed of the flame-retardant urethane resin composition according to one or more embodiments of the present disclosure can prevent dense residues formed by heat resulting from fire from being broken. If the amount of the additive added is equal to or less than 70 parts by weight, foaming of the flame-retardant urethane resin composition according to one or more embodiments of the present disclosure is not hindered.

The flame-retardant urethane resin composition according to one or more embodiments of the present disclosure is cured by a reaction. Accordingly, the viscosity thereof changes over time.

Therefore, before being used, the flame-retardant urethane resin composition according to one or more embodiments of the present disclosure is separated into 2 or more fractions so as to prevent the flame-retardant urethane resin composition from being cured by a reaction. The flame-retardant urethane resin composition according to one or more embodiments of the present disclosure that has been separated into 2 or more fractions is combined at the time of use, and in this way, the flame-retardant urethane resin composition according to one or more embodiments of the present disclosure is obtained.

At the time of separating the flame-retardant urethane resin composition into 2 or more fractions, components of each fraction of the flame-retardant urethane resin composition having been separated into 2 or more fractions may be separated, such that the components of each fraction of the flame-retardant urethane resin composition having been separated into 2 or more fractions do not start to be cured independently, and the curing reaction starts after the components of the flame-retardant urethane resin composition are mixed together.

Next, the method for manufacturing the flame-retardant urethane resin composition according to one or more embodiments of the present disclosure will be described.

The method for manufacturing the flame-retardant urethane resin composition is not particularly limited. For example, the flame-retardant urethane resin composition can be obtained by a method of mixing the respective components of the flame-retardant urethane resin composition together, a method of manufacturing the flame-retardant urethane resin composition in the form of a coating material by means of suspending the flame-retardant urethane resin composition in an organic solvent or melting the flame-retardant urethane resin composition by heating, a method of preparing a slurry by dispersing the flame-retardant urethane resin composition in a solvent, or a method of melting the flame-retardant urethane resin composition by heating when the reactive curable resin component contained in the flame-retardant urethane resin composition contains a component which stays in a solid state at a temperature of 25° C.

The flame-retardant urethane resin composition can be obtained by kneading the respective components thereof by using a known apparatus such as a single screw extruder, a twin screw extruder, a Banbury mixer, a kneader mixer, a kneading roll, a Raikai mixer, or a planetary stirrer.

The flame-retardant urethane resin composition can also be obtained by mixing each of the main agent of the urethane resin and the curing agent with a filler or the like in advance, and then kneading the mixture by using a static mixer, a dynamic mixer, or the like immediately before the mixture is injected into a vessel.

Furthermore, the flame-retardant urethane resin composition can be obtained by kneading the components of the flame-retardant urethane resin composition excluding the catalyst and the catalyst in the same manner as described above immediately before the components are injected into a vessel.

The flame-retardant urethane resin composition according to one or more embodiments of the present disclosure can be obtained by the methods described above.

Next, the method for curing the flame-retardant urethane resin composition according to one or more embodiments of the present disclosure will be described.

When the respective components of the flame-retardant urethane resin composition are mixed together, a reaction starts, viscosity thereof increases over time, and as a result, the composition loses fluidity.

For example, by curing the flame-retardant urethane resin composition by means of injecting it into a vessel such as a mold or a frame material, a molded article formed of the flame-retardant urethane resin composition can be obtained in the form of foam.

For obtaining the molded article formed of the flame-retardant urethane resin composition, heat or pressure can be applied to the composition.

A specific gravity of the molded article formed of the flame-retardant urethane resin composition is preferably within a range of 0.030 to 0.130, because the molded article is handled easily. The specific gravity is more preferably within a range of 0.040 to 0.100, even more preferably within a range of 0.040 to 0.080, and most preferably within a range of 0.050 to 0.060.

Next, examples of the application of the flame-retardant urethane resin composition according to one or more embodiments of the present disclosure will be described.

If the flame-retardant urethane resin composition is sprayed to structures such as buildings, furniture, automobiles, trams, and ships, a foam layer formed of the flame-retardant urethane resin composition can be formed on the surface of the structures.

Examples of the method for forming the foam layer include a method of separating the flame-retardant urethane resin composition into the polyisocyanate compound and other components in advance, and then spraying the polyisocyanate compound and other components onto the surface of the structure while mixing them together by spraying, a method of mixing the polyisocyanate compound and other components together and then spraying them onto the surface of the structure, and the like.

By the aforementioned method, the foam layer can be formed on the surface of the structure.

Next, a fireproof test performed on the molded article formed of the flame-retardant urethane resin composition will be described.

The molded article formed of the flame-retardant urethane resin composition is cut to 10 cm (length)×10 cm (width)×5 cm (thickness), thereby preparing samples for a cone calorimeter test.

By using the samples of a cone calorimeter test, it is possible to measure a gross calorific value of the samples, which are heated for 20 minutes at an intensity of radiant heat of 50 kW/m$^2$, by a cone calorimeter test based on the test method of ISO-5660.

Hereinafter, one or more embodiments of the present disclosure will be specifically described based on examples, but the present disclosure is not limited to the following examples.

Example 1

As shown in the formulation in Table 1, a flame-retardant urethane resin composition according to Example 1 was prepared by being separated into 3 fractions including components (A) to (C). Herein, the details of the respective components shown in Tables 1 to 10 are as follows.

Component (A): Polyol Compound (a) Polyol Compound

A-1: Polyol 1 p-Phthalic acid polyester polyol (manufactured by KAWASAKI KASEI CHEMICALS LTD., trade name: Maximol RFK-505, hydroxyl value=250 mgKOH/g)

A-2: Polyol 2 o-Phthalic acid polyester polyol (manufactured by KAWASAKI KASEI CHEMICALS LTD., trade name: Maximol RDK-142, hydroxyl value=400 mgKOH/g)

A-3: Polyol 3 o-Phthalic acid polyester polyol (manufactured by KAWASAKI KASEI CHEMICALS LTD., trade name: Maximol RDK-121, hydroxyl value=260 mgKOH/g)

A-4: Polyol 4 p-Phthalic acid polyester polyol (manufactured by KAWASAKI KASEI CHEMICALS LTD., trade name: Maximol RLK-035, hydroxyl value=150 mgKOH/g)

A-5: Polyol 5

Polyether polyol (manufactured by Mitsui Chemicals, Inc., trade name: Actcol T-400, hydroxyl value=399 mgKOH/g)

A-6: Polyol 6

Polyether polyol (manufactured by Mitsui Chemicals, Inc., trade name: Actcol T-700, hydroxyl value=250 mgKOH/g)

A-7: Polyol 7

Polyether polyol (manufactured by Mitsui Chemicals, Inc., trade name: Actcol GR84T, hydroxyl value=454 mgKOH/g)

A-8: Polyol 8

Polyether polyol (manufactured by Mitsui Chemicals, Inc., trade name: Actcol SOR400, hydroxyl value=397 mgKOH/g)

(b) Foam Stabilizer

Foam stabilizer containing polyalkylene glycol (manufactured by Dow Corning Toray Co., Ltd., trade name: SH-193)

(c) Catalyst

[Trimerization Catalyst]

B-1: potassium 2-ethylhexanoate (manufactured by Tokyo Chemical Industry Co., Ltd., product code: P0048)

B-2: trimerization catalyst (manufactured by TOSOH CORPORATION, trade name: TOYOCAT-TR20)

B-3: trimerization catalyst (manufactured by TOET CHEMICAL INDUSTRY CO., LTD., trade name: hexoate potassium 15%)

[Urethanization Catalyst]

Pentamethyldiethylenetriamine (manufactured by TOSOH CORPORATION, trade name: TOYOCAT-DT)

(d) Foaming Agent

Water

HFC-365mfc (1,1,1,3,3-pentafluorobutane, manufactured by Central Glass Co., Ltd.)

HFC-245fa (1,1,1,3,3-pentafluoropropane, manufactured by Solvay Japan)

Mixing ratio: HFC-365mfc:HFC-245fa=7:3 (weight ratio, hereinafter, referred to as "HFC")

Pentane

Component (B): isocyanate compound (hereinafter, referred to as "polyisocyanate")

MDI (manufactured by Nippon Polyurethane Industry Co., Ltd., trade name: Millionate MR-200), viscosity: 167 mPa·s Component (C): Additive C-1: red phosphorus (manufactured by RIN KAGAKU KOGYO Co., Ltd., trade name: RINKA_FE140)

C-2: ammonium dihydrogen phosphate (manufactured by Taihei Chemical Industrial Co., Ltd.)

C-3: tris(β-chloropropyl)phosphate (manufactured by DAIHACHI CHEMICAL INDUSTRY CO., LTD., trade name: TMCPP, hereinafter, referred to as "TMCPP")

C-4: hexabromobenzene (manufactured by Manac Incorporated, trade name: HBB-b, hereinafter, referred to as "HBB")

C-5: zinc borate (manufactured by HAYAKAWA & CO., LTD., trade name: Firebrake ZB)

C-6: antimony trioxide (manufactured by NIHON SEIKO CO., LTD., trade name: Patox C)

C-7: aluminum hydroxide (manufactured by Almorix Co., Ltd., trade name: B-325)

C-8: diammonium hydrogen phosphate (manufactured by Taihei Chemical Industrial Co., Ltd.)

C-9: aluminum phosphate monobasic (manufactured by Taihei Chemical Industrial Co., Ltd.)

C-10: sodium phosphate monobasic (manufactured by Taihei Chemical Industrial Co., Ltd.)

C-11: ammonium polyphosphate (manufactured by Clariant Japan K.K., trade name: AP422)

C-12: halogen-containing condensed phosphoric acid ester (manufactured by DAIHACHI CHEMICAL INDUSTRY CO., LTD., trade name: DAIGUARD-540)

C-13: non-halogenated condensed phosphoric acid ester (manufactured by DAIHACHI CHEMICAL INDUSTRY CO., LTD., trade name: CR-733S)

C-14: ethylene bis(tetrabromophthalimide) (manufactured by ALBEMARLE CORPORATION, trade name: SAYTEX BT-93, hereinafter, referred to as "EBTBPI")

C-15: ethylene bis(pentabromophenyl) (manufactured by ALBEMARLE CORPORATION, trade name: SAYTEX 8010, hereinafter, referred to as "EBPBP")

According to the formulation shown in the following Table 1, the component (A) as a polyol compound and the component (C) as an additive were weighed and put into a 1,000 mL polypropylene beaker and then manually mixed and stirred together for 1 minute at 25° C.

The component (B) was added to a kneaded material composed of the component (A) and the component (C) having undergone stirring, and the resultant was stirred for about 10 seconds by using a hand mixer, thereby preparing foam.

The obtained flame-retardant urethane resin composition lost fluidity with the passage of time, and foam of the flame-retardant urethane resin composition was obtained. The foam was evaluated based on the following criteria. The results are shown in Table 1.

[Calorific Measurement]

From the cured material, samples for a cone calorimeter test were cut to 10 cm×10 cm×5 cm. Based on ISO-5660, the samples were heated for 20 minutes at an intensity of radiant heat of 50 kW/m$^2$ so as to measure the maximum heat release rate and the gross calorific value thereof.

The results are shown in Tables 1 to 10.

The present measurement method is a test method specified by the General Building Research Corporation of Japan, which is a public institution stipulated by Article 108(2) of an enforcement decree of the Building Standard Law. The measurement method is regarded as corresponding to the standard according to a cone calorimeter method, and is based on the test method of ISO-5660.

[Measurement of Expansion]

When the ISO-5660 test was performed, if an expanded molded article came into contact with a lighter, the molded article was evaluated to be "X", and if it did not come into contact with the lighter, the molded article was evaluated to be "O". The results are shown in Tables 1 to 10.

[Measurement of Deformation (Cracking)]

When the test of ISO-5660 was performed, if deformation occurred even in the rear surface of a sample for the test, the sample was evaluated to be "X", and if deformation did not occur in the rear surface of a sample, the sample was evaluated to be "O". The results are shown in Tables 1 to 10.

[Measurement of Contraction]

When the test of ISO-5660 was performed, if a sample for the test was deformed by 1 cm or more in the width direction and by 5 mm or more in the thickness direction, the sample was evaluated to be "X", and if a sample was not deformed, the sample was evaluated to be "O". The results are shown in Tables 1 to 10.

[Comprehensive Evaluation]

A sample which was evaluated to be "O" in all of the calorific measurement, the measurement of expansion, the measurement of deformation (cracking), and the measurement of contraction was evaluated to be "OK", and samples other than this were evaluated to be "NG". The results are shown in Tables 1 to 10.

TABLE 1

|  |  |  | Example 1 | Example 2 | Example 3 | Example 4 | Example 5 | Example 6 | Example 7 | Example 8 | Example 9 | Example 10 |
|---|---|---|---|---|---|---|---|---|---|---|---|---|
| Polyol composition | Polyol compound | A-1 | 21.8 | 21.8 | 21.8 | 21.8 | 21.8 | 21.8 | 21.8 | 21.8 | 21.8 | 21.8 |
|  |  | A-2 | — | — | — | — | — | — | — | — | — | — |
|  |  | A-3 | — | — | — | — | — | — | — | — | — | — |
|  |  | A-4 | — | — | — | — | — | — | — | — | — | — |
|  |  | A-5 | — | — | — | — | — | — | — | — | — | — |
|  |  | A-6 | — | — | — | — | — | — | — | — | — | — |
|  |  | A-7 | — | — | — | — | — | — | — | — | — | — |
|  |  | A-8 | — | — | — | — | — | — | — | — | — | — |
|  | Foam stabilizer |  | 1.7 | 1.7 | 1.7 | 1.7 | 1.7 | 1.7 | 1.7 | 1.7 | 1.7 | 1.7 |
|  | Trimerization catalyst | B-1 | 0.5 | 0.5 | 0.5 | 0.5 | 0.5 | 0.5 | 0.5 | 0.5 | 0.5 | 0.5 |
|  |  | B-2 | 0.7 | 0.7 | 0.7 | 0.7 | 0.7 | 0.7 | 0.7 | 0.7 | 0.7 | 0.7 |
|  | Urethanization catalyst |  | 0.1 | 0.1 | 0.1 | 0.1 | 0.1 | 0.1 | 0.1 | 0.1 | 0.1 | 0.1 |
|  | Foaming agent | Water | 0.6 | 0.6 | 0.6 | 0.6 | 0.6 | 0.6 | 0.6 | 0.6 | 0.6 | 0.6 |
|  |  | HFC | 3.9 | 3.9 | 4.6 | 4.8 | 4.7 | 3.7 | 4.7 | 4.7 | 4.7 | 3.7 |
| Polyisocyanate |  |  | 78.2 | 78.2 | 78.2 | 78.2 | 78.2 | 78.2 | 78.2 | 78.2 | 78.2 | 78.2 |
| Additive | Red phosphorus | C-1 | 3.0 | 6.0 | 12.0 | 18.0 | 10.0 | 6.0 | 13.3 | 10.0 | 4.0 | 3.3 |
|  | Ammonium dihydrogen phosphate | C-2 | 9.0 | 3.0 | 6.0 | 6.0 | 10.0 | — | — | — | — | — |
|  | TMCPP | C-3 | — | — | — | — | — | 7.0 | 6.7 | 10.0 | 16.0 | — |
|  | HBB | C-4 | — | — | — | — | — | — | — | — | — | 1.7 |
|  | Zinc borate | C-5 | — | — | — | — | — | — | — | — | — | — |
|  | Antimony trioxide | C-6 | — | — | — | — | — | — | — | — | — | — |
|  | Aluminum hydroxide | C-7 | — | — | — | — | — | — | — | — | — | — |
| Density (g/cm$^3$) |  |  | 0.056 | 0.052 | 0.055 | 0.054 | 0.053 | 0.054 | 0.057 | 0.055 | 0.054 | 0.052 |
| Isocyanate INDEX |  |  | 400 | 400 | 400 | 400 | 400 | 400 | 400 | 400 | 400 | 400 |
| Gross calorific value (MJ/m$^2$): after elapse of 10 minutes |  |  | 3.7 | 2.3 | 3.4 | 6.7 | 7.6 | 3.6 | 4.9 | 4.6 | 6.6 | 7.6 |
| Gross calorific value (MJ/m$^2$): after elapse of 20 minutes |  |  | 5.0 | 4.4 | 5.6 | 7.7 | 11.3 | 7.8 | 8.5 | 6.0 | 9.4 | 10.4 |
| Gross calorific value |  |  | ⊚ | ⊚ | ⊚ | ⊚ | ○ | ⊚ | ○ | ⊚ | ○ | ○ |
| State of residue | Expansion |  | ○ | ○ | ○ | ○ | ○ | ○ | ○ | ○ | ○ | ○ |
|  | Deformation |  | ○ | ○ | ○ | ○ | ○ | ○ | ○ | ○ | ○ | ○ |
|  | Contraction |  | ○ | ○ | ○ | ○ | ○ | ○ | ○ | ○ | ○ | ○ |
| Determination |  |  | OK | OK | OK | OK | OK | OK | OK | OK | OK | OK |

Example 2

The test was performed in exactly the same manner as in Example 1, except that, compared to Example 1, the amount of red phosphorus used was changed to 6.0 parts by weight from 3.0 parts by weight in Example 1, and the amount of ammonium dihydrogen phosphate used was changed to 3.0 parts by weight from 9.0 parts by weight in Example 1.

The results are shown in Table 1.

Example 3

The test was performed in exactly the same manner as in Example 1, except that, compared to Example 1, the amount of the foaming agent HFC used was changed to 4.6 parts by weight from 3.9 parts by weight in Example 1, the amount of red phosphorus used was changed to 12.0 parts by weight from 3.0 parts by weight in Example 1, and the amount of ammonium dihydrogen phosphate used was changed to 6.0 parts by weight from 9.0 parts by weight in Example 1.

The results are shown in Table 1.

Example 4

The test was performed in exactly the same manner as in Example 1, except that, compared to Example 1, the amount of the foaming agent HFC used was changed to 4.8 parts by weight from 3.9 parts by weight in Example 1, the amount of red phosphorus used was changed to 18.0 parts by weight from 3.0 parts by weight in Example 1, and the amount of ammonium dihydrogen phosphate used was changed to 6.0 parts by weight from 9.0 parts by weight in Example 1.

The results are shown in Table 1.

Example 5

The test was performed in exactly the same manner as in Example 1, except that, compared to Example 1, the amount of the foaming agent HFC used was changed to 4.7 parts by weight from 3.9 parts by weight in Example 1, the amount of red phosphorus used was changed to 10.0 parts by weight from 3.0 parts by weight in Example 1, and the amount of ammonium dihydrogen phosphate used was changed to 10.0 parts by weight from 9.0 parts by weight in Example 1.

The results are shown in Table 1.

Example 6

The test was performed in exactly the same manner as in Example 1, except that, compared to Example 1, the amount of the foaming agent HFC used was changed to 3.7 parts by weight from 3.9 parts by weight in Example 1, the amount of red phosphorus used was changed to 6.0 parts by weight from 3.0 parts by weight in Example 1, and 7.0 parts by weight of TMCPP was used instead of ammonium dihydrogen phosphate.

The results are shown in Table 1.

Example 7

The test was performed in exactly the same manner as in Example 6, except that, compared to Example 6, the amount of the foaming agent HFC used was changed to 4.7 parts by weight from 3.7 parts by weight in Example 6, the amount of red phosphorus used was changed to 13.3 parts by weight from 6.0 parts by weight in Example 6, and the amount of TMCPP used was changed to 6.7 parts by weight from 7.0 parts by weight in Example 6.

The results are shown in Table 1.

Example 8

The test was performed in exactly the same manner as in Example 7, except that, compared to Example 7, the amount of red phosphorus used was changed to 10.0 parts by weight from 13.3 parts by weight in Example 7, and the amount of TMCPP used was changed to 10.0 parts by weight from 6.7 parts by weight in Example 7.

The results are shown in Table 1.

Example 9

The test was performed in exactly the same manner as in Example 8, except that, compared to Example 8, the amount of red phosphorus used was changed to 4.0 parts by weight from 10.0 parts by weight in Example 8, and the amount of TMCPP used was changed to 16.0 parts by weight from 10.0 parts by weight in Example 8.

The results are shown in Table 1.

Example 10

The test was performed in exactly the same manner as in Example 1, except that, compared to Example 1, the amount of the foaming agent HFC used was changed to 3.7 parts by weight from 3.9 parts by weight in Example 1, the amount of red phosphorus used was changed to 3.3 parts by weight from 3.0 parts by weight in Example 1, and 1.7 parts by weight of HBB was used instead of ammonium dihydrogen phosphate.

The results are shown in Table 1.

Example 11

The test was performed in exactly the same manner as in Example 10, except that, compared to Example 10, the amount of the foaming agent HFC used was changed to 3.8 parts by weight from 3.7 parts by weight in Example 10, the amount of red phosphorus used was changed to 6.0 parts by weight from 3.3 parts by weight in Example 10, and the amount of HBB used was changed to 3.0 parts by weight from 1.7 parts by weight in Example 10.

The results are shown in Table 2.

Example 12

The test was performed in exactly the same manner as in Example 10, except that, compared to Example 10, the amount of the foaming agent HFC used was changed to 4.5 parts by weight from 3.7 parts by weight in Example 10, the amount of red phosphorus used was changed to 13.3 parts by weight from 3.3 parts by weight in Example 10, and the amount of HBB used was changed to 6.7 parts by weight from 1.7 parts by weight in Example 10.

The results are shown in Table 2.

Example 13

The test was performed in exactly the same manner as in Example 10, except that, compared to Example 10, the amount of the foaming agent HFC used was changed to 4.3 parts by weight from 3.7 parts by weight in Example 10, the amount of red phosphorus used was changed to 10.0 parts by weight from 3.3 parts by weight in Example 10, and the amount of EBB used was changed to 10.0 parts by weight from 1.7 parts by weight in Example 10.

The results are shown in Table 2.

Example 14

The test was performed in exactly the same manner as in Example 10, except that, compared to Example 10, the amount of the foaming agent HFC used was changed to 4.1 parts by weight from 3.7 parts by weight in Example 10, the amount of red phosphorus used was changed to 4.0 parts by weight from 3.3 parts by weight in Example 10, and the amount of HBB used was changed to 16.0 parts by weight from 1.7 parts by weight in Example 10.

The results are shown in Table 2.

Example 15

The test was performed in exactly the same manner as in Example 11, except that, compared to Example 11, 6.0 parts by weight of zinc borate was used instead of HBB.

The results are shown in Table 2.

Example 16

The test was performed in exactly the same manner as in Example 11, except that, compared to Example 11, 3.0 parts by weight of antimony trioxide was used instead of HBB.

The results are shown in Table 2.

Example 17

The test was performed in exactly the same manner as in Example 11, except that, compared to Example 11, 3.0 parts by weight of aluminum hydroxide was used instead of HBB.

The results are shown in Table 2.

Example 18

The test was performed in exactly the same manner as in Example 1, except that, compared to Example 1, the amount of red phosphorus used was changed to 3.8 parts by weight from 3.0 parts by weight in Example 1, the amount of ammonium dihydrogen phosphate used was changed to 1.9 parts by weight from 9.0 parts by weight in Example 1, and 4.4 parts by weight of TMCPP was used.

The results are shown in Table 2.

Example 19

The test was performed in exactly the same manner as in Example 18, except that, compared to Example 18, the amount of the foaming agent HFC used was changed to 4.6 parts by weight from 3.9 parts by weight in Example 18, the amount of red phosphorus used was changed to 6.0 parts by weight from 3.8 parts by weight in Example 18, the amount of ammonium dihydrogen phosphate used was changed to 3.0 parts by weight from 1.9 parts by weight in Example 18, and the amount of TMCPP used was changed to 7.0 parts by weight from 4.4 parts by weight in Example 18.

The results are shown in Table 2.

Example 20

The test was performed in exactly the same manner as in Example 19, except that, compared to Example 19, the amount of the foaming agent HFC used was changed to 4.7 parts by weight from 4.6 parts by weight in Example 19, the amount of red phosphorus used was changed to 7.5 parts by weight from 6.0 parts by weight in Example 19, the amount of ammonium dihydrogen phosphate used was changed to 3.8 parts by weight from 3.0 parts by weight in Example 19, and the amount of TMCPP used was changed to 8.8 parts by weight from 7.0 parts by weight in Example 19.

The results are shown in Table 2.

weight from 7.5 parts by weight in Example 20, the amount of ammonium dihydrogen phosphate used was changed to 7.5 parts by weight from 3.8 parts by weight in Example 20, and the amount of TMCPP used was changed to 17.5 parts by weight from 8.8 parts by weight in Example 20.

The results are shown in Table 3.

Example 22

The test was performed in exactly the same manner as in Example 1, except that, compared to Example 1, the amount of the foaming agent HFC used was changed to 3.5 parts by weight from 3.9 parts by weight in Example 1, the amount of red phosphorus used was changed to 5.0 parts by weight from 3.0 parts by weight in Example 1, the amount of ammonium dihydrogen phosphate used was changed to 2.5 parts by weight from 9.0 parts by weight in Example 1, and 2.5 parts by weight of HBB was used.

The results are shown in Table 3.

TABLE 2

| | | | Example 11 | Example 12 | Example 13 | Example 14 | Example 15 | Example 16 | Example 17 | Example 18 | Example 19 | Example 20 |
|---|---|---|---|---|---|---|---|---|---|---|---|---|
| Polyol composition | Polyol compound | A-1 | 21.8 | 21.8 | 21.8 | 21.8 | 21.8 | 21.8 | 21.8 | 21.8 | 21.8 | 21.8 |
| | | A-2 | — | — | — | — | — | — | — | — | — | — |
| | | A-3 | — | — | — | — | — | — | — | — | — | — |
| | | A-4 | — | — | — | — | — | — | — | — | — | — |
| | | A-5 | — | — | — | — | — | — | — | — | — | — |
| | | A-6 | — | — | — | — | — | — | — | — | — | — |
| | | A-7 | — | — | — | — | — | — | — | — | — | — |
| | | A-8 | — | — | — | — | — | — | — | — | — | — |
| | Foam stabilizer | | 1.7 | 1.7 | 1.7 | 1.7 | 1.7 | 1.7 | 1.7 | 1.7 | 1.7 | 1.7 |
| | Trimerization catalyst | B-1 | 0.5 | 0.5 | 0.5 | 0.5 | 0.5 | 0.5 | 0.5 | 0.5 | 0.5 | 0.5 |
| | | B-2 | 0.7 | 0.7 | 0.7 | 0.7 | 0.7 | 0.7 | 0.7 | 0.7 | 0.7 | 0.7 |
| | Urethanization catalyst | | 0.1 | 0.1 | 0.1 | 0.1 | 0.1 | 0.1 | 0.1 | 0.1 | 0.1 | 0.1 |
| | Foaming agent | Water | 0.6 | 0.6 | 0.6 | 0.6 | 0.6 | 0.6 | 0.6 | 0.6 | 0.6 | 0.6 |
| | | HFC | 3.8 | 4.5 | 4.3 | 4.1 | 3.8 | 3.8 | 3.8 | 3.9 | 4.6 | 4.7 |
| Polyisocyanate | | | 78.2 | 78.2 | 78.2 | 78.2 | 78.2 | 78.2 | 78.2 | 78.2 | 78.2 | 78.2 |
| Additive | Red phosphorus | C-1 | 6.0 | 13.3 | 10.0 | 4.0 | 6.0 | 6.0 | 6.0 | 3.8 | 6.0 | 7.5 |
| | Ammonium dihydrogen phosphate | C-2 | — | — | — | — | — | — | — | 1.9 | 3.0 | 3.8 |
| | TMCPP | C-3 | — | — | — | — | — | — | — | 4.4 | 7.0 | 8.8 |
| | HBB | C-4 | 3.0 | 6.7 | 10.0 | 16.0 | — | — | — | — | — | — |
| | Zinc borate | C-5 | — | — | — | — | 6.0 | — | — | — | — | — |
| | Antimony trioxide | C-6 | — | — | — | — | — | 3.0 | — | — | — | — |
| | Aluminum hydroxide | C-7 | — | — | — | — | — | — | 3.0 | — | — | — |
| Density (g/m$^3$) | | | 0.052 | 0.050 | 0.056 | 0.053 | 0.051 | 0.050 | 0.051 | 0.055 | 0.055 | 0.055 |
| Isocyanate INDEX | | | 400 | 400 | 400 | 400 | 400 | 400 | 400 | 400 | 400 | 400 |
| Gross calorific value (MJ/m$^2$): after elapse of 10 minutes | | | 3.2 | 5.6 | 5.7 | 6.0 | 7.8 | 6.1 | 4.7 | 6.5 | 4.5 | 4.5 |
| Gross calorific value (MJ/m$^2$): after elapse of 20 minutes | | | 4.5 | 8.5 | 8.8 | 8.2 | 11.3 | 9.3 | 5.9 | 8.2 | 5.9 | 5.4 |
| Gross calorific value | | | ⊚ | ◯ | ◯ | ◯ | ◯ | ◯ | ⊚ | ◯ | ⊚ | ⊚ |
| State of residue | Expansion | | ◯ | ◯ | ◯ | ◯ | ◯ | ◯ | ◯ | ◯ | ◯ | ◯ |
| | Deformation | | ◯ | ◯ | ◯ | ◯ | ◯ | ◯ | ◯ | ◯ | ◯ | ◯ |
| | Contraction | | ◯ | ◯ | ◯ | ◯ | ◯ | ◯ | ◯ | ◯ | ◯ | ◯ |
| Determination | | | OK | OK | OK | OK | OR | OK | OK | OK | OK | OK |

Example 21

The test was performed in exactly the same manner as in Example 20, except that, compared to Example 20, the amount of the foaming agent HFC used was changed to 6.4 parts by weight from 4.7 parts by weight in Example 20, the amount of red phosphorus used was changed to 15.0 parts by Example 23

The test was performed in exactly the same manner as in Example 22, except that, compared to Example 22, the amount of the foaming agent HFC used was changed to 3.9 parts by weight from 3.5 parts by weight in Example 22, the amount of red phosphorus used was changed to 6.0 parts by weight from 5.0 parts by weight in Example 22, the amount of ammonium dihydrogen phosphate used was changed to 3.0 parts by weight from 2.5 parts by weight in Example 22, and the amount of HBB used was changed to 3.0 parts by weight from 2.5 parts by weight in Example 22.

The results are shown in Table 3.

Example 24

The test was performed in exactly the same manner as in Example 22, except that, compared to Example 22, the amount of the foaming agent HFC used was changed to 4.5 parts by weight from 3.5 parts by weight in Example 22, the amount of red phosphorus used was changed to 10.0 parts by weight from 5.0 parts by weight in Example 22, the amount of ammonium dihydrogen phosphate used was changed to 5.0 parts by weight from 2.5 parts by weight in Example 22, and the amount of HBB used was changed to 5.0 parts by weight from 2.5 parts by weight in Example 22.

The results are shown in Table 3.

Example 25

The test was performed in exactly the same manner as in Example 22, except that, compared to Example 22, the amount of the foaming agent HFC used was changed to 5.5 parts by weight from 3.5 parts by weight in Example 22, the amount of red phosphorus used was changed to 20.0 parts by weight from 5.0 parts by weight in Example 22, the amount of ammonium dihydrogen phosphate used was changed to 10.0 parts by weight from 2.5 parts by weight in Example 22, and the amount of HBB used was changed to 10.0 parts by weight from 2.5 parts by weight in Example 22.

The results are shown in Table 3.

Example 26

The test was performed in exactly the same manner as in Example 22, except that, compared to Example 22, the amount of the foaming agent HFC used was changed to 3.9 parts by weight from 3.5 parts by weight in Example 22, the amount of red phosphorus used was changed to 3.8 parts by weight from 5.0 parts by weight in Example 22, 4.4 parts by weight of TMCPP was used instead of ammonium dihydrogen phosphate, and the amount of HBB used was changed to 1.9 parts by weight from 2.5 parts by weight in Example 22.

The results are shown in Table 3.

Example 27

The test was performed in exactly the same manner as in Example 26, except that, compared to Example 26, the amount of the foaming agent HFC used was changed to 4.4 parts by weight from 3.9 parts by weight in Example 26, the amount of red phosphorus used was changed to 6.0 parts by weight from 3.8 parts by weight in Example 26, the amount of TMCPP used was changed to 7.0 parts by weight from 4.4 parts by weight in Example 26, and the amount of HBB used was changed to 3.0 parts by weight from 1.9 parts by weight in Example 26.

The results are shown in Table 3.

Example 28

The test was performed in exactly the same manner as in Example 26, except that, compared to Example 26, the amount of the foaming agent HFC used was changed to 4.6 parts by weight from 3.9 parts by weight in Example 26, the amount of red phosphorus used was changed to 7.5 parts by weight from 3.8 parts by weight in Example 26, the amount of TMCPP used was changed to 8.8 parts by weight from 4.4 parts by weight in Example 26, and the amount of HBB used was changed to 3.8 parts by weight from 1.9 parts by weight in Example 26.

The results are shown in Table 3.

Example 29

The test was performed in exactly the same manner as in Example 26, except that, compared to Example 26, the amount of the foaming agent HFC used was changed to 6.1 parts by weight from 3.9 parts by weight in Example 26, the amount of red phosphorus used was changed to 15.0 parts by weight from 3.8 parts by weight in Example 26, the amount of TMCPP used was changed to 17.5 parts by weight from 4.4 parts by weight in Example 26, and the amount of HBB used was changed to 7.5 parts by weight from 1.9 parts by weight in Example 26.

The results are shown in Table 3.

Example 30

The test was performed in exactly the same manner as in Example 22, except that, compared to Example 22, the amount of the foaming agent HFC used was changed to 4.3 parts by weight from 3.5 parts by weight in Example 22, the amount of red phosphorus used was changed to 6.0 parts by weight from 5.0 parts by weight in Example 22, the amount of ammonium dihydrogen phosphate used was changed to 3.0 parts by weight from 2.5 parts by weight in Example 22, and 6.0 parts by weight of zinc borate was used instead of HBB.

The results are shown in Table 3.

TABLE 3

|  |  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|---|
| Polyol composition | Polyol compound | A-1 | 21.8 | 21.8 | 21.8 | 21.8 | 21.8 | 21.8 | 21.8 | 21.8 | 21.8 | 21.8 |
|  |  | A-2 | — | — | — | — | — | — | — | — | — | — |
|  |  | A-3 | — | — | — | — | — | — | — | — | — | — |
|  |  | A-4 | — | — | — | — | — | — | — | — | — | — |
|  |  | A-5 | — | — | — | — | — | — | — | — | — | — |
|  |  | A-6 | — | — | — | — | — | — | — | — | — | — |
|  |  | A-7 | — | — | — | — | — | — | — | — | — | — |
|  |  | A-8 | — | — | — | — | — | — | — | — | — | — |
|  | Foam stabiliser |  | 1.7 | 1.7 | 1.7 | 1.7 | 1.7 | 1.7 | 1.7 | 1.7 | 1.7 | 1.7 |

TABLE 3-continued

|  |  |  | Example 21 | Example 22 | Example 23 | Example 24 | Example 25 | Example 26 | Example 27 | Example 28 | Example 29 | Example 30 |
|---|---|---|---|---|---|---|---|---|---|---|---|---|
|  | Trimerization catalyst | B-1 | 0.5 | 0.5 | 0.5 | 0.5 | 0.5 | 0.5 | 0.5 | 0.5 | 0.5 | 0.5 |
|  |  | B-2 | 0.7 | 0.7 | 0.7 | 0.7 | 0.7 | 0.7 | 0.7 | 0.7 | 0.7 | 0.7 |
|  | Urethanization catalyst |  | 0.1 | 0.1 | 0.1 | 0.1 | 0.1 | 0.1 | 0.1 | 0.1 | 0.1 | 0.1 |
|  | Foaming agent | Water | 0.6 | 0.6 | 0.6 | 0.6 | 0.6 | 0.6 | 0.6 | 0.6 | 0.6 | 0.6 |
|  |  | HFC | 6.4 | 3.5 | 3.9 | 4.5 | 5.5 | 3.9 | 4.4 | 4.6 | 6.1 | 4.3 |
| Polyisocyanate |  |  | 78.2 | 78.2 | 78.2 | 78.2 | 78.2 | 78.2 | 78.2 | 78.2 | 78.2 | 78.2 |
| Additive | Red phosphorus | C-1 | 15.0 | 5.0 | 6.0 | 10.0 | 20.0 | 3.8 | 6.0 | 7.5 | 15.0 | 6.0 |
|  | Ammonium dihydrogen phosphate | C-2 | 7.5 | 2.5 | 3.0 | 5.0 | 10.0 | — | — | — | — | 3.0 |
|  | TMCPP | C-3 | 17.5 | — | — | — | — | 4.4 | 7.0 | 8.8 | 17.5 | — |
|  | HBB | C-4 | — | 2.5 | 3.0 | 5.0 | 10.0 | 1.9 | 3.0 | 3.8 | 7.5 | — |
|  | Zinc borate | C-5 | — | — | — | — | — | — | — | — | — | 6.0 |
|  | Antimony trioxide | C-6 | — | — | — | — | — | — | — | — | — | — |
|  | Aluminum hydroxide | C-7 | — | — | — | — | — | — | — | — | — | — |
| Density (g/cm$^3$) |  |  | 0.055 | 0.050 | 0.055 | 0.055 | 0.052 | 0.055 | 0.055 | 0.055 | 0.055 | 0.055 |
| Isocyanate INDEX |  |  | 400 | 400 | 400 | 400 | 400 | 400 | 400 | 400 | 400 | 400 |
| Gross calorific value (MJ/m$^2$): after elapse of 10 minutes |  |  | 7.4 | 5.3 | 4.6 | 3.8 | 7.1 | 7.3 | 4.1 | 4.1 | 6.8 | 6.4 |
| Gross calorific value (MJ/m$^2$): after elapse of 20 minutes |  |  | 9.9 | 7.5 | 5.4 | 5.2 | 10.9 | 9.2 | 5.3 | 5.6 | 10.8 | 9.3 |
| Gross calorific value |  |  | ◯ | ◯◯ | ◯◯ | ◯◯ | ◯ | ◯ | ◯◯ | ◯◯ | ◯ | ◯ |
| State of residue | Expansion |  | ◯ | ◯ | ◯ | ◯ | ◯ | ◯ | ◯ | ◯ | ◯ | ◯ |
|  | Deformation |  | ◯ | ◯ | ◯ | ◯ | ◯ | ◯ | ◯ | ◯ | ◯ | ◯ |
|  | Contraction |  | ◯ | ◯ | ◯ | ◯ | ◯ | ◯ | ◯ | ◯ | ◯ | ◯ |
| Determination |  |  | OK | OK | OK | OK | OK | OK | OK | OK | OK | OK |

Example 31

The test was performed in exactly the same manner as in Example 22, except that, compared to Example 22, the amount of the foaming agent HFC used was changed to 4.4 parts by weight from 3.5 parts by weight in Example 22, the amount of red phosphorus used was changed to 6.0 parts by weight from 5.0 parts by weight in Example 22, 7.0 parts by weight of TMCPP was used instead of ammonium dihydrogen phosphate, and 6.0 parts by weight of zinc borate was used instead of EBB.

The results are shown in Table 4.

Example 32

The test was performed in exactly the same manner as in Example 31, except that, compared to Example 31, the amount of the foaming agent EEC used was changed to 4.2 parts by weight from 4.4 parts by weight in Example 31, and 3.0 parts by weight of EBB was used instead of TMCPP.

The results are shown in Table 4.

Example 33

The test was performed in exactly the same manner as in Example 18, except that, compared to Example 18, the amount of red phosphorus used was changed to 3.2 parts by weight from 3.8 parts by weight in Example 18, the amount of ammonium dihydrogen phosphate used was changed to 1.6 parts by weight from 1.9 parts by weight in Example 18, the amount of TMCPP used was changed to 3.6 parts by weight from 4.4 parts by weight in Example 18, and 1.6 parts by weight of HBB was used The results are shown in Table 4.

Example 34

The test was performed in exactly the same manner as in Example 33, except that, compared to Example 33, the amount of the foaming agent HFC used was changed to 4.7 parts by weight from 3.9 parts by weight in Example 33, the amount of red phosphorus used was changed to 6.0 parts by weight from 3.2 parts by weight in Example 33, the amount of ammonium dihydrogen phosphate used was changed to 3.0 parts by weight from 1.6 parts by weight in Example 33, the amount of TMCPP used was changed to 7.0 parts by weight from 3.6 parts by weight in Example 33, and the amount of HER used was changed to 3.0 parts by weight from 1.6 parts by weight in Example 33.

The results are shown in Example 4.

Example 35

The test was performed in exactly the same manner as in Example 33, except that, compared to Example 33, the amount of the foaming agent HFC used was changed to 6.0 parts by weight from 3.9 parts by weight in Example 33, the amount of red phosphorus used was changed to 9.5 parts by weight from 3.2 parts by weight in Example 33, the amount of ammonium dihydrogen phosphate used was changed to 4.7 parts by weight from 1.6 parts by weight in Example 33, the amount of TMCPP used was changed to 11.1 parts by weight from 3.6 parts by weight in Example 33, and the amount of HBB used was changed to 4.7 parts by weight from 1.6 parts by weight in Example 33.

The results are shown in Example 4.

Example 36

The test was performed in exactly the same manner as in Example 33, except that, compared to Example 33, the amount of the foaming agent HFC used was changed to 6.4 parts by weight from 3.9 parts by weight in Example 33, the amount of red phosphorus used was changed to 12.6 parts by weight from 3.2 parts by weight in Example 33, the amount of ammonium dihydrogen phosphate used was changed to 6.3 parts by weight from 1.6 parts by weight in Example 33, the amount of TMCPP used was changed to 14.8 parts by weight from 3.6 parts by weight in Example 33, and the amount of EBB used was changed to 6.3 parts by weight from 1.6 parts by weight in Example 33.

The results are shown in Example 4.

Example 37

The test was performed in exactly the same manner as in Example 33, except that, compared to Example 33, the amount of the foaming agent HFC used was changed to 7.9 parts by weight from 3.9 parts by weight in Example 33, the amount of red phosphorus used was changed to 15.0 parts by weight from 3.2 parts by weight in Example 33, the amount of ammonium dihydrogen phosphate used was changed to 7.9 parts by weight from 1.6 parts by weight in Example 33, the amount of TMCPP used was changed to 18.4 parts by weight from 3.6 parts by weight in Example 33, and the amount of HBB used was changed to 7.9 parts by weight from 1.6 parts by weight in Example 33.

The results are shown in Example 4.

Example 38

The test was performed in exactly the same manner as in Example 33, except that, compared to Example 33, the amount of the foaming agent HFC used was changed to 4.7 parts by weight from 3.9 parts by weight in Example 33, the amount of red phosphorus used was changed to 6.0 parts by weight from 3.2 parts by weight in Example 33, the amount of ammonium dihydrogen phosphate used was changed to 3.0 parts by weight from 1.6 parts by weight in Example 33, the amount of TMCPP used was changed to 7.0 parts by weight from 3.6 parts by weight in Example 33, the amount of HBB used was changed to 3.0 parts by weight from 1.6 parts by weight in Example 33, and 6.0 parts by weight of zinc borate was used.

The results are shown in Example 4.

Example 39

The test was performed in exactly the same manner as in Example 34, except that, compared to Example 34, the amount of the polyol compound A-1 used was changed to 35.8 parts by weight from 21.8 parts by weight in Example 34, the amount of polyisocyanate used was changed to 64.2 parts by weight from 78.2 parts by weight in Example 34, and the amount of the foaming agent HFC used was changed to 4.6 parts by weight from 4.7 parts by weight in Example 34.

The results are shown in Table 4.

Example 40

The test was performed in exactly the same manner as in Example 39, except that, compared to Example 39, the amount of the polyol compound A-1 used was changed to 27.1 parts by weight from 35.8 parts by weight in Example 39, and the amount of polyisocyanate used was changed to 72.9 parts by weight from 64.2 parts by weight in Example 39.

The results are shown in Table 4.

TABLE 4

| | | | Example 31 | Example 32 | Example 33 | Example 34 | Example 35 | Example 36 | Example 37 | Example 38 | Example 39 | Example 40 |
|---|---|---|---|---|---|---|---|---|---|---|---|---|
| Polyol composition | Polyol compound | A-1 | 21.8 | 21.8 | 21.8 | 21.8 | 21.8 | 21.8 | 21.8 | 21.8 | 35.8 | 27.1 |
| | | A-2 | — | — | — | — | — | — | — | — | — | — |
| | | A-3 | — | — | — | — | — | — | — | — | — | — |
| | | A-4 | — | — | — | — | — | — | — | — | — | — |
| | | A-5 | — | — | — | — | — | — | — | — | — | — |
| | | A-6 | — | — | — | — | — | — | — | — | — | — |
| | | A-7 | — | — | — | — | — | — | — | — | — | — |
| | | A-8 | — | — | — | — | — | — | — | — | — | — |
| | Foam stabilizer | | 1.7 | 1.7 | 1.7 | 1.7 | 1.7 | 1.7 | 1.7 | 1.7 | 1.7 | 1.7 |
| | Trimerization catalyst | B-1 | 0.5 | 0.5 | 0.5 | 0.5 | 0.5 | 0.5 | 0.5 | 0.5 | 0.5 | 0.5 |
| | | B-2 | 0.7 | 0.7 | 0.7 | 0.7 | 0.7 | 0.7 | 0.7 | 0.7 | 0.7 | 0.7 |
| | Urethanization catalyst | | 0.1 | 0.1 | 0.1 | 0.1 | 0.1 | 0.1 | 0.1 | 0.1 | 0.1 | 0.1 |
| | Foaming agent | Water | 0.6 | 0.6 | 0.6 | 0.6 | 0.6 | 0.6 | 0.6 | 0.6 | 0.6 | 0.6 |
| | | HFC | 4.4 | 4.2 | 3.9 | 4.7 | 6.0 | 6.4 | 7.9 | 4.7 | 4.6 | 4.6 |
| Polyisocyanate | | | 78.2 | 78.2 | 78.2 | 78.2 | 78.2 | 78.2 | 78.2 | 78.2 | 64.2 | 72.9 |
| Additive | Red phosphorus | C-1 | 6.0 | 6.0 | 3.2 | 6.0 | 9.5 | 12.6 | 15.8 | 6.0 | 6.0 | 6.0 |
| | Ammonium dihydrogen phosphate | C-2 | — | — | 1.6 | 3.0 | 4.7 | 6.3 | 7.9 | 3.0 | 3.0 | 3.0 |
| | TMCPP | C-3 | 7.0 | — | 3.6 | 7.0 | 11.1 | 14.8 | 18.4 | 7.0 | 7.0 | 7.0 |
| | HBB | C-4 | — | 3.0 | 1.6 | 3.0 | 4.7 | 6.3 | 7.9 | 3.0 | 3.0 | 3.0 |
| | Zinc borate | C-5 | 6.0 | 6.0 | — | — | — | — | — | 6.0 | — | — |
| | Antimony trioxide | C-6 | — | — | — | — | — | — | — | — | — | — |
| | Aluminum hydroxide | C-7 | — | — | — | — | — | — | — | — | — | — |
| Density (g/cm$^3$) | | | 0.055 | 0.055 | 0.054 | 0.055 | 0.057 | 0.056 | 0.059 | 0.055 | 0.054 | 0.055 |
| Isocyanate INDEX | | | 400 | 400 | 400 | 400 | 400 | 400 | 400 | 400 | 200 | 300 |
| Gross calorific value (MJ/m$^2$): after elapse of 10 minutes | | | 4.0 | 3.7 | 3.7 | 2.0 | 3.2 | 3.9 | 5.6 | 5.1 | 3.8 | 4.3 |

TABLE 4-continued

|  |  | Example 31 | Example 32 | Example 33 | Example 34 | Example 35 | Example 36 | Example 37 | Example 38 | Example 39 | Example 40 |
|---|---|---|---|---|---|---|---|---|---|---|---|
| Gross calorific value (MJ/m$^2$): after elapse of 20 minutes | | 5.0 | 5.4 | 7.0 | 4.2 | 6.6 | 7.6 | 7.7 | 6.1 | 5.5 | 5.3 |
| Gross calorific value | | ○○ | ○○ | ○○ | ○○ | ○○ | ○○ | ○○ | ○○ | ○○ | ○○ |
| State of residue | Expansion | ○ | ○ | ○ | ○ | ○ | ○ | ○ | ○ | ○ | ○ |
|  | Deformation | ○ | ○ | ○ | ○ | ○ | ○ | ○ | ○ | ○ | ○ |
|  | Contraction | ○ | ○ | ○ | ○ | ○ | ○ | ○ | ○ | ○ | ○ |
| Determination | | OK | OK | OK | OK | OK | OK | OK | OK | OK | OK |

Example 41

The test was performed in exactly the same manner as in Example 39, except that, compared to Example 39, the amount of the polyol compound A-1 used was changed to 18.2 parts by weight from 35.8 parts by weight in Example 39, and the amount of polyisocyanate used was changed to 81.8 parts by weight from 64.2 parts by weight in Example 39.

The results are shown in Table 5.

Example 42

The test was performed in exactly the same manner as in Example 39, except that, compared to Example 39, the amount of the polyol compound A-1 used was changed to 15.7 parts by weight from 35.8 parts by weight in Example 39, and the amount of polyisocyanate used was changed to 84.3 parts by weight from 64.2 parts by weight in Example 39.

The results are shown in Table 5.

Example 43

The test was performed in exactly the same manner as in Example 39, except that, compared to Example 39, the amount of the polyol compound A-1 used was changed to 13.7 parts by weight from 35.8 parts by weight in Example 39, and the amount of polyisocyanate used was changed to 86.3 parts by weight from 64.2 parts by weight in Example 39.

The results are shown in Table 5.

Example 44

The test was performed in exactly the same manner as in Example 39, except that, compared to Example 39, the amount of the polyol compound A-1 used was changed to 12.2 parts by weight from 35.8 parts by weight in Example 39, and the amount of polyisocyanate used was changed to 87.8 parts by weight from 64.2 parts by weight in Example 39.

The results are shown in Table 5.

Example 45

The test was performed in exactly the same manner as in Example 39, except that, compared to Example 39, the amount of the polyol compound A-1 used was changed to 11.0 parts by weight from 35.8 parts by weight in Example 39, and the amount of polyisocyanate used was changed to 89.0 parts by weight from 64.2 parts by weight in Example 39.

The results are shown in Table 5.

Example 46

The test was performed in exactly the same manner as in Example 39, except that, compared to Example 39, the amount of the polyol compound A-1 used was changed to 10.0 parts by weight from 35.8 parts by weight in Example 39, and the amount of polyisocyanate used was changed to 90.0 parts by weight from 64.2 parts by weight in Example 39.

The results are shown in Table 5.

Example 47

The test was performed in exactly the same manner as in Example 39, except that, compared to. Example 39, 16.6 parts by weight of the polyol compound A-2 was used instead of the polyol compound A-1, and the amount of polyisocyanate used was changed to 83.4 parts by weight from 64.2 parts by weight in Example 39.

The results are shown in Table 5.

Example 48

The test was performed in exactly the same manner as in Example 39, except that, compared to Example 39, 21.4 parts by weight of the polyol compound A-3 was used instead of the polyol compound A-1, and the amount of polyisocyanate used was changed to 78.6 parts by weight from 64.2 parts by weight in Example 39.

The results are shown in Table 5.

Example 49

The test was performed in exactly the same manner as in Example 39, except that, compared to Example 39, 27.6 parts by weight of the polyol compound A-4 was used instead of the polyol compound A-1, and the amount of polyisocyanate used was changed to 72.4 parts by weight from 64.2 parts by weight in Example 39.

The results are shown in Table 5.

Example 50

The test was performed in exactly the same manner as in Example 39, except that, compared to Example 39, 21.8 parts by weight of the polyol compound A-5 was used instead of the polyol compound A-1, and the amount of polyisocyanate used was changed to 78.2 parts by weight from 64.2 parts by weight in Example 39.

The results are shown in Table 5.

TABLE 5

|  |  |  | Example 41 | Example 42 | Example 43 | Example 44 | Example 45 | Example 46 | Example 47 | Example 48 | Example 49 | Example 50 |
|---|---|---|---|---|---|---|---|---|---|---|---|---|
| Polyol composition | Polyol compound | A-1 | 18.2 | 15.7 | 13.7 | 12.2 | 11.0 | 10.0 | — | — | — | — |
|  |  | A-2 | — | — | — | — | — | — | 16.6 | — | — | — |
|  |  | A-3 | — | — | — | — | — | — | — | 21.4 | — | — |
|  |  | A-4 | — | — | — | — | — | — | — | — | 27.6 | — |
|  |  | A-5 | — | — | — | — | — | — | — | — | — | 21.8 |
|  |  | A-6 | — | — | — | — | — | — | — | — | — | — |
|  |  | A-7 | — | — | — | — | — | — | — | — | — | — |
|  |  | A-8 | — | — | — | — | — | — | — | — | — | — |
|  | Foam stabilizer |  | 1.7 | 1.7 | 1.7 | 1.7 | 1.7 | 1.7 | 1.7 | 1.7 | 1.7 | 1.7 |
|  | Trimerization catalyst | B-1 | 0.5 | 0.5 | 0.5 | 0.5 | 0.5 | 0.5 | 0.5 | 0.5 | 0.5 | 0.5 |
|  |  | B-2 | 0.7 | 0.7 | 0.7 | 0.7 | 0.7 | 0.7 | 0.7 | 0.7 | 0.7 | 0.7 |
|  | Urethanization catalyst |  | 0.1 | 0.1 | 0.1 | 0.1 | 0.1 | 0.1 | 0.1 | 0.1 | 0.1 | 0.1 |
|  | Foaming agent | Water | 0.6 | 0.6 | 0.6 | 0.6 | 0.6 | 0.6 | 0.6 | 0.6 | 0.6 | 0.6 |
|  |  | HFC | 4.6 | 4.6 | 4.6 | 4.6 | 4.6 | 4.6 | 4.6 | 4.6 | 4.6 | 4.6 |
| Polyisocyanate |  |  | 81.8 | 84.3 | 86.3 | 87.8 | 89.0 | 90.0 | 83.4 | 78.6 | 72.4 | 78.2 |
| Additive | Red phosphorus | C-1 | 6.0 | 6.0 | 6.0 | 6.0 | 6.0 | 6.0 | 6.0 | 6.0 | 6.0 | 6.0 |
|  | Ammonium dihydrogen phosphate | C-2 | 3.0 | 3.0 | 3.0 | 3.0 | 3.0 | 3.0 | 3.0 | 3.0 | 3.0 | 3.0 |
|  | TMCPP | C-3 | 7.0 | 7.0 | 7.0 | 7.0 | 7.0 | 7.0 | 7.0 | 7.0 | 7.0 | 7.0 |
|  | HBB | C-4 | 3.0 | 3.0 | 3.0 | 3.0 | 3.0 | 3.0 | 3.0 | 3.0 | 3.0 | 3.0 |
|  | Zinc borate | C-5 | — | — | — | — | — | — | — | — | — | — |
|  | Antimony trioxide | C-6 | — | — | — | — | — | — | — | — | — | — |
|  | Aluminum hydroxide | C-7 | — | — | — | — | — | — | — | — | — | — |
| Density (g/cm$^3$) |  |  | 0.055 | 0.052 | 0.054 | 0.058 | 0.055 | 0.053 | 0.055 | 0.052 | 0.054 | 0.056 |
| Isocyanate INDEX |  |  | 500 | 600 | 700 | 800 | 900 | 1000 | 400 | 400 | 400 | 400 |
| Gross calorific value (MJ/m$^2$): after elapse of 10 minutes |  |  | 4.5 | 3.7 | 3.4 | 5.6 | 5.5 | 4.7 | 6.5 | 6.2 | 7.1 | 7.7 |
| Gross calorific value (MJ/m$^2$): after elapse of 20 minutes |  |  | 6.2 | 6.8 | 5.9 | 7.0 | 7.0 | 7.1 | 8.7 | 8.5 | 8.1 | 12.7 |
| Gross calorific value |  |  | ◯◯ | ◯◯ | ◯◯ | ◯◯ | ◯◯ | ◯◯ | ◯ | ◯ | ◯ | ◯ |
| State of residue | Expansion |  | ◯ | ◯ | ◯ | ◯ | ◯ | ◯ | ◯ | ◯ | ◯ | ◯ |
|  | Deformation |  | ◯ | ◯ | ◯ | ◯ | ◯ | ◯ | ◯ | ◯ | ◯ | ◯ |
|  | Contraction |  | ◯ | ◯ | ◯ | ◯ | ◯ | ◯ | ◯ | ◯ | ◯ | ◯ |
| Determination |  |  | OK | OK | OK | OK | OK | OK | OK | OK | OK | OK |

Example 51

The test was performed in exactly the same manner as in Example 39, except that, compared to Example 39, 16.6 parts by weight of the polyol compound A-6 was used instead of the polyol compound A-1, and the amount of polyisocyanate used was changed to 83.4 parts by weight from 64.2 parts by weight in Example 39.

The results are shown in Table 6.

Example 52

The test was performed in exactly the same manner as in Example 39, except that, compared to Example 39, 15.3 parts by weight of the polyol compound A-7 was used instead of the polyol compound A-1, and the amount of polyisocyanate used was changed to 84.7 parts by weight from 64.2 parts by weight in Example 39.

The results are shown in Table 6.

Example 53

The test was performed in exactly the same manner as in Example 39, except that, compared to Example 39, 16.7 parts by weight of the polyol compound A-8 was used instead of the polyol compound A-1, and the amount of polyisocyanate used was changed to 83.3 parts by weight from 64.2 parts by weight in Example 39.

The results are shown in Table 6.

Example 54

The test was performed in exactly the same manner as in Example 39, except that, compared to Example 39, the amount of the polyol compound A-1 used was changed to 21.8 parts by weight from 35.8 parts by weight in Example 39, the amount of each of the trimerization catalysts B-1 and B-2 used was changed to 1.3 parts by weight and 1.7 parts by weight respectively from 0.5 parts by weight and 0.7 parts by weight in Example 39, and the amount of polyisocyanate used was changed to 78.2 parts by weight from 64.2 parts by weight in Example 39.

The results are shown in Table 6.

Example 55

The test was performed in exactly the same manner as in Example 39, except that, compared to Example 39, the amount of the polyol compound A-1 used was changed to 21.8 parts by weight from 35.8 parts by weight in Example 39, 0.8 parts by weight of B-3 was used instead of the trimerization catalysts B-1 and B-2, and the amount of polyisocyanate used was changed to 78.2 parts by weight from 64.2 parts by weight in Example 39.

The results are shown in Table 6.

Example 56

The test was performed in exactly the same manner as in Example 39, except that, compared to Example 39, the amount of the polyol compound A-1 used was changed to 21.8 parts by weight from 35.8 parts by weight in Example 39, the amount of the trimerization catalyst B-1 used was changed to 1.0 part by weight from 0.5 parts by weight, B-2 was not used, and the amount of polyisocyanate used was changed to 78.2 parts by weight from 64.2 parts by weight in Example 39.

The results are shown in Table 6.

Example 57

The test was performed in exactly the same manner as in Example 39, except that the amount of the polyol compound A-1 used was changed to 29.5 parts by weight from 35.8 parts by weight in Example 39, water was not used in the foaming agent, the amount of HFC used was changed to 10.0 parts by weight from 4.6 parts by weight, and the amount of polyisocyanate used was changed to 70.5 parts by weight from 64.2 parts by weight in Example 39.

The results are shown in Table 6.

Example 58

The test was performed in exactly the same manner as in Example 39, except that, compared to Example 39, the amount of the polyol compound A-1 used was changed to 21.8 parts by weight from 35.8 parts by weight in Example 39, the amount of HFC used was changed to 16.0 parts by weight from 4.6 parts by weight, and the amount of polyisocyanate used was changed to 78.2 parts by weight from 64.2 parts by weight in Example 39.

The results are shown in Table 6.

Example 59

The test was performed in exactly the same manner as in Example 39, except that, compared to Example 39, the amount of the polyol compound A-1 used was changed to 21.8 parts by weight from 35.8 parts by weight in Example 39, HFC was not used, and the amount of polyisocyanate used was changed to 78.2 parts by weight from 64.2 parts by weight in Example 39.

The results are shown in Table 6.

Example 60

The test was performed in exactly the same manner as in Example 39, except that, compared to Example 39, the amount of the polyol compound A-1 used was changed to 24.8 parts by weight from 35.8 parts by weight in Example 39, the amount of water used in the foaming agent was changed to 0.3 parts by weight from 0.6 parts by weight, HFC was not used, and the amount of polyisocyanate used was changed to 75.2 parts by weight from 64.2 parts by weight in Example 39.

The results are shown in Table 6.

TABLE 6

| | | | Example 51 | Example 52 | Example 53 | Example 54 | Example 55 | Example 56 | Example 57 | Example 58 | Example 59 | Example 60 |
|---|---|---|---|---|---|---|---|---|---|---|---|---|
| Polyol composition | Polyol compound | A-1 | — | — | — | 21.8 | 21.8 | 21.8 | 29.5 | 21.8 | 21.8 | 24.8 |
| | | A-2 | — | — | — | — | — | — | — | — | — | — |
| | | A-3 | — | — | — | — | — | — | — | — | — | — |
| | | A-4 | — | — | — | — | — | — | — | — | — | — |
| | | A-5 | — | — | — | — | — | — | — | — | — | — |
| | | A-6 | 16.6 | — | — | — | — | — | — | — | — | — |
| | | A-7 | — | 15.3 | — | — | — | — | — | — | — | — |
| | | A-8 | — | — | 16.7 | — | — | — | — | — | — | — |
| | Foam stabilizer | | 1.7 | 1.7 | 1.7 | 1.7 | 1.7 | 1.7 | 1.7 | 1.7 | 1.7 | 1.7 |
| | Trimerization catalyst | B-1 | 0.5 | 0.5 | 0.5 | 1.3 | — | 1.0 | 0.5 | 0.5 | 0.5 | 0.5 |
| | | B-2 | 0.7 | 0.7 | 0.7 | 1.7 | — | — | 0.7 | 0.7 | 0.7 | 0.7 |
| | | B-3 | — | — | — | — | 0.8 | — | — | — | — | — |
| | Urethanization catalyst | | 0.1 | 0.1 | 0.1 | 0.1 | 0.1 | 0.1 | 0.1 | 0.1 | 0.1 | 0.1 |
| | Foaming agent | Water | 0.6 | 0.6 | 0.6 | 0.6 | 0.6 | 0.6 | — | 0.6 | 0.6 | 0.3 |
| | | HFC | 4.6 | 4.6 | 4.6 | 4.6 | 4.6 | 4.6 | 10.0 | 16.0 | — | — |
| | | Pentane | — | — | — | — | — | — | — | — | — | — |
| Polyisocyanate | | | 83.4 | 84.7 | 83.3 | 78.2 | 78.2 | 78.2 | 70.5 | 78.2 | 78.2 | 75.2 |
| Additive | Red phosphorus | C-1 | 6.0 | 6.0 | 6.0 | 6.0 | 6.0 | 6.0 | 6.0 | 6.0 | 6.0 | 6.0 |
| | Ammonium dihydrogen phosphate | C-2 | 3.0 | 3.0 | 3.0 | 3.0 | 3.0 | 3.0 | 3.0 | 3.0 | 3.0 | 3.0 |
| | TMCPP | C-3 | 7.0 | 7.0 | 7.0 | 7.0 | 7.0 | 7.0 | 7.0 | 7.0 | 7.0 | 7.0 |
| | HBB | C-4 | 3.0 | 3.0 | 3.0 | 3.0 | 3.0 | 3.0 | 3.0 | 3.0 | 3.0 | 3.0 |
| | Zinc borate | C-5 | — | — | — | — | — | — | — | — | — | — |
| | Antimony trioxide | C-6 | — | — | — | — | — | — | — | — | — | — |
| | Aluminum hydroxide | C-7 | — | — | — | — | — | — | — | — | — | — |
| Density (g/cm$^3$) | | | 0.051 | 0.052 | 0.051 | 0.051 | 0.058 | 0.059 | 0.052 | 0.035 | 0.080 | 0.123 |
| Isocyanate INDEX | | | 400 | 400 | 400 | 400 | 400 | 400 | 400 | 400 | 400 | 400 |
| Gross calorific value (MJ/m$^2$): after elapse of 10 minutes | | | 7.3 | 6.9 | 7.3 | 4.2 | 3.8 | 4.4 | 2.3 | 4.4 | 5.3 | 5.3 |
| Gross calorific value (MJ/m$^2$): after elapse of 20 minutes | | | 9.2 | 9.5 | 10.1 | 5.7 | 4.8 | 6.1 | 4.9 | 6.5 | 7.1 | 8.5 |
| Gross calorific value | | | ◯ | ◯ | ◯ | ◯◯ | ◯◯ | ◯◯ | ◯◯ | ◯◯ | ◯◯ | ◯ |

TABLE 6-continued

| | | Example 51 | Example 52 | Example 53 | Example 54 | Example 55 | Example 56 | Example 57 | Example 58 | Example 59 | Example 60 |
|---|---|---|---|---|---|---|---|---|---|---|---|
| State of residue | Expansion | ◯ | ◯ | ◯ | ◯ | ◯ | ◯ | ◯ | ◯ | ◯ | ◯ |
| | Deformation | ◯ | ◯ | ◯ | ◯ | ◯ | ◯ | ◯ | ◯ | ◯ | ◯ |
| | Contraction | ◯ | ◯ | ◯ | ◯ | ◯ | ◯ | ◯ | ◯ | ◯ | ◯ |
| Determination | | OK | OK | OK | OK | OK | OK | OK | OK | OK | OK |

Example 61

The test was performed in exactly the same manner as in Example 6, except that, compared to Example 6, the amount of HFC used was changed to 3.5 parts by weight from 3.7 parts by weight, and 3.0 parts by weight of diammonium hydrogen phosphate was used instead of TMCPP.

The results are shown in Table 7.

Example 62

The test was performed in exactly the same manner as in Example 61, except that, compared to Example 61, 3.0 parts by weight of aluminum phosphate monobasic was used instead of diammonium hydrogen phosphate.

The results are shown in Table 7.

Example 63

The test was performed in exactly the same manner as in Example 61, except that, compared to Example 61, 3.0 parts by weight of sodium phosphate monobasic was used instead of diammonium hydrogen phosphate.

The results are shown in Table 7.

Example 64

The test was performed in exactly the same manner as in Example 61, except that, compared to Example 61, 3.0 parts by weight of ammonium polyphosphate was used instead of diammonium hydrogen phosphate.

The results are shown in Table 7.

Example 65

The test was performed in exactly the same manner as in Example 61, except that, compared to Example 61, the amount of HFC used was changed to 4.0 parts by weight from 3.5 parts by weight, and 7.0 parts by weight of a phosphoric acid ester 1 was used instead of diammonium hydrogen phosphate.

The results are shown in Table 7.

Example 66

The test was performed in exactly the same manner as in Example 65, except that, compared to Example 65, 7.0 parts by weight of a phosphoric acid ester 2 was used instead of the phosphoric acid ester 1.

The results are shown in Table V.

Example 67

The test was performed in exactly the same manner as in Example 61, except that, compared to Example 61, 3.0 parts by weight of ammonium dihydrogen phosphate and 7.0 parts by weight of TMCPP were used, and 3.0 parts by weight of EBTBPI was used instead of diammonium hydrogen phosphate.

The results are shown in Example 7.

Example 68

The test was performed in exactly the same manner as in Example 67, except that, compared to Example 67, 3.0 parts by weight of EBTBP was used instead of EBTBPI.

The results are shown in Table 7.

Example 69

The test was performed in exactly the same manner as in Example 33, except that, compared to Example 33, the amount of the polyol compound A-1 used was changed to 15.8 parts by weight from 21.8 parts by weight in Example 33, the amount of polyisocyanate used was changed to 84.2 parts by weight from 78.2 parts by weight in Example 33, the amount of the foaming agent HFC used was changed to 4.4 parts by weight from 3.9 parts by weight in Example 33, the amount of red phosphorus used was changed to 3.8 parts by weight from 3.2 parts by weight in Example 33, the amount of ammonium dihydrogen phosphate used was changed to 1.9 parts by weight from 1.6 parts by weight in Example 33, the amount of TMCPP used was changed to 4.4 parts by weight from 3.6 parts by weight in Example 33, and the amount of HBB used was changed to 1.9 parts by weight from 1.6 parts by weight in Example 33.

The results are shown in Table 7.

Example 70

The test was performed in exactly the same manner as in Example 33, except that, compared to Example 33, the amount of the polyol compound A-1 used was changed to 17.7 parts by weight from 21.8 parts by weight in Example 39, the amount of polyisocyanate used was changed to 82.3 parts by weight from 78.2 parts by weight in Example 33, the amount of red phosphorus used was changed to 3.0 parts by weight from 3.2 parts by weight in Example 33, the amount of ammonium dihydrogen phosphate used was changed to 1.5 parts by weight from 1.6 parts by weight in Example 33, the amount of TMCPP used was changed to 3.5 parts by weight from 3.6 parts by weight in Example 33, and the amount of HBB used was changed to 1.5 parts by weight from 1.6 parts by weight in Example 33.

The results are shown in Table 7.

TABLE 7

| | | | Example 61 | Example 62 | Example 63 | Example 64 | Example 65 | Example 66 | Example 67 | Example 68 | Example 69 | Example 70 |
|---|---|---|---|---|---|---|---|---|---|---|---|---|
| Polyol composition | Polyol compound | A-1 | 21.8 | 21.8 | 21.8 | 21.8 | 21.8 | 21.8 | 21.8 | 21.8 | 15.8 | 17.7 |
| | | A-2 | — | — | — | — | — | — | — | — | — | — |
| | | A-3 | — | — | — | — | — | — | — | — | — | — |
| | | A-4 | — | — | — | — | — | — | — | — | — | — |
| | | A-5 | — | — | — | — | — | — | — | — | — | — |
| | | A-6 | — | — | — | — | — | — | — | — | — | — |
| | | A-7 | — | — | — | — | — | — | — | — | — | — |
| | | A-8 | — | — | — | — | — | — | — | — | — | — |
| | Foam stabilizer | | 1.7 | 1.7 | 1.7 | 1.7 | 1.7 | 1.7 | 1.7 | 1.7 | 1.7 | 1.7 |
| | Trimerization catalyst | B-1 | 0.5 | 0.5 | 0.5 | 0.5 | 0.5 | 0.5 | 0.5 | 0.5 | 0.5 | 0.5 |
| | | B-2 | 0.7 | 0.7 | 0.7 | 0.7 | 0.7 | 0.7 | 0.7 | 0.7 | 0.7 | 0.7 |
| | Urethanization catalyst | | 0.1 | 0.1 | 0.1 | 0.1 | 0.1 | 0.1 | 0.1 | 0.1 | 0.1 | 0.1 |
| | Foaming agent | Water | 0.6 | 0.6 | 0.6 | 0.6 | 0.6 | 0.6 | 0.6 | 0.6 | 0.6 | 0.6 |
| | | HFC | 3.5 | 3.5 | 3.5 | 3.5 | 4.0 | 4.0 | 4.7 | 4.7 | 4.4 | 3.9 |
| | | Pentane | — | — | — | — | — | — | — | — | — | — |
| Polyisocyanate | | | 78.2 | 78.2 | 78.2 | 78.2 | 78.2 | 78.2 | 78.2 | 78.2 | 84.2 | 82.3 |
| Additive | Red phosphorus | C-1 | 6.0 | 6.0 | 6.0 | 6.0 | 6.0 | 6.0 | 6.0 | 6.0 | 3.8 | 3.0 |
| | Ammonium dihydrogen phosphate | C-2 | — | — | — | — | — | — | 3.0 | 3.0 | 1.9 | 1.5 |
| | TMCPP | C-3 | — | — | — | — | — | — | 7.0 | 7.0 | 4.4 | 3.5 |
| | HBB | C-4 | — | — | — | — | — | — | — | — | 1.9 | 1.5 |
| | Zinc borate | C-5 | — | — | — | — | — | — | — | — | — | — |
| | Antimony trioxide | C-6 | — | — | — | — | — | — | — | — | — | — |
| | Aluminum hydroxide | C-7 | — | — | — | — | — | — | — | — | — | — |
| | Diammonium hydrogen phosphate | C-8 | 3.0 | — | — | — | — | — | — | — | — | — |
| | Aluminum phosphate monobasic | C-9 | — | 3.0 | — | — | — | — | — | — | — | — |
| | Sodium phosphate monobasic | C-10 | — | — | 3.0 | — | — | — | — | — | — | — |
| | Ammonium polyphosphate | C-11 | — | — | — | 3.0 | — | — | — | — | — | — |
| | Phosphoric acid ester 1 | C-12 | — | — | — | — | 7.0 | — | — | — | — | — |
| | Phosphoric acid ester 2 | C-13 | — | — | — | — | — | 7.0 | — | — | — | — |
| | EBTBPI | C-14 | — | — | — | — | — | — | — | 3.0 | — | — |
| | EBTBP | C-15 | — | — | — | — | — | — | 3.0 | — | — | — |
| Density (g/cm$^3$) | | | 0.052 | 0.054 | 0.051 | 0.054 | 0.055 | 0.057 | 0.054 | 0.055 | 0.058 | 0.056 |
| Isocyanate INDEX | | | 400 | 400 | 400 | 400 | 400 | 400 | 400 | 400 | 590 | 520 |
| Gross calorific value (MJ/m$^2$): after elapse of 10 minutes | | | 2.3 | 2.1 | 4.7 | 3.0 | 4.0 | 3.9 | 4.2 | 3.9 | 3.0 | 3.9 |
| Gross calorific value (MJ/m$^2$): after elapse of 20 minutes | | | 4.4 | 4.4 | 6.6 | 5.5 | 4.9 | 5.0 | 5.6 | 5.9 | 4.3 | 6.0 |
| Gross calorific value | | | ◯◯ | ◯◯ | ◯◯ | ◯◯ | ◯◯ | ◯◯ | ◯◯ | ◯◯ | ◯◯ | ◯◯ |
| State of residue | Expansion | | ◯ | ◯ | ◯ | ◯ | ◯ | ◯ | ◯ | ◯ | ◯ | ◯ |
| | Deformation | | ◯ | ◯ | ◯ | ◯ | ◯ | ◯ | ◯ | ◯ | ◯ | ◯ |
| | Contraction | | ◯ | ◯ | ◯ | ◯ | ◯ | ◯ | ◯ | ◯ | ◯ | ◯ |
| Determination | | | OK | OK | OK | OK | OK | OK | OK | OK | OK | OK |

Example 71

The test was performed in exactly the same manner as in Example 33, except that, compared to Example 33, the amount of the polyol compound A-1 used was changed to 16.8 parts by weight from 21.8 parts by weight in Example 33, the amount of polyisocyanate used was changed to 83.2 parts by weight from 78.2 parts by weight in Example 33, the amount of HFC used was changed to 6.0 parts by weight from 3.9 parts by weight, the amount of red phosphorus used was changed to 9.6 parts by weight from 3.2 parts by weight in Example 33, the amount of ammonium dihydrogen phosphate used was changed to 4.8 parts by weight from 1.6 parts by weight in Example 33, the amount of TMCPP used was changed to 11.2 parts by weight from 3.6 parts by weight in Example 33, and the amount of HBB used was changed to 4.8 parts by weight from 1.6 parts by weight in Example 33.

The results are shown in Table 8.

Example 72

The test was performed in exactly the same manner as in Example 71, except that, compared to Example 71, the amount of the polyol compound A-1 used was changed to 30.6 parts by weight from 16.8 parts by weight in Example 71, and the amount of polyisocyanate used was changed to 69.4 parts by weight from 83.2 parts by weight in Example 71.

The results are shown in Table 8.

Example 73

The test was performed in exactly the same manner as in Example 71, except that, compared to Example 71, the amount of the polyol compound A-1 used was changed to 26.4 parts by weight from 16.8 parts by weight in Example 71, the amount of HFC used was changed to 6.4 parts by weight from 6.0 parts by weight, the amount of polyisocyanate used was changed to 70.6 parts by weight from 83.2 parts by weight in Example 71, the amount of red phosphorus used was changed to 13.3 parts by weight from 9.6 parts by weight in Example 71, the amount of ammonium dihydrogen phosphate was changed to 6.6 parts by weight from 4.8 parts by weight in Example 71, the amount of TMCPP used was changed to 15.5 parts by weight from 11.2 parts by weight in Example 71, and the amount of HBB used was changed to 6.6 parts by weight from 4.8 parts by weight in Example 71.

The results are shown in Table 8.

Example 74

The test was performed in exactly the same manner as in Example 34, except that, compared to Example 34, the amount of the foam stabilizer used was changed to 6.8 parts by weight from 1.7 parts by weight in Example 34.

The results are shown in Table 8.

Example 75

The test was performed in exactly the same manner as in Example 34, except that, compared to Example 34, the amount of the foam stabilizer used was changed to 10.0 parts by weight from 1.7 parts by weight in Example 34.

The results are shown in Table 8.

Example 76

The test was performed in exactly the same manner as in Example 34, except that, compared to Example 34, the urethanization catalyst was not used.

The results are shown in Table 8.

TABLE 8

|  |  |  | Example 71 | Example 72 | Example 73 | Example 74 | Example 75 | Example 76 |
|---|---|---|---|---|---|---|---|---|
| Polyol composition | Polyol compound | A-1 | 16.8 | 30.6 | 26.4 | 21.8 | 21.8 | 21.8 |
|  |  | A-2 | — | — | — | — | — | — |
|  |  | A-3 | — | — | — | — | — | — |
|  |  | A-4 | — | — | — | — | — | — |
|  |  | A-5 | — | — | — | — | — | — |
|  |  | A-6 | — | — | — | — | — | — |
|  |  | A-7 | — | — | — | — | — | — |
|  |  | A-8 | — | — | — | — | — | — |
|  | Foam stabilizer |  | 1.7 | 1.7 | 1.7 | 6.8 | 10.0 | 1.7 |
|  | Trimerization catalyst | B-1 | 0.5 | 0.5 | 0.5 | 0.5 | 0.5 | 0.5 |
|  |  | B-2 | 0.7 | 0.7 | 0.7 | 0.7 | 0.7 | 0.7 |
|  | Urethanization catalyst |  | 0.1 | 0.1 | 0.1 | 0.1 | 0.1 | — |
|  | Foaming agent | Water | 0.6 | 0.6 | 0.6 | 0.6 | 0.6 | 0.6 |
|  |  | HFC | 6.0 | 6.0 | 6.4 | 4.7 | 4.7 | 4.7 |
|  |  | Pentane | — | — | — | — | — | — |
| Polyisocyanate |  |  | 83.2 | 69.4 | 70.6 | 78.2 | 78.2 | 78.2 |
| Additive | Red phosphorus | C-1 | 9.6 | 9.6 | 13.3 | 6.0 | 6.0 | 6.0 |
|  | Ammonium dihydrogen phosphate | C-2 | 4.8 | 4.8 | 6.6 | 3.0 | 3.0 | 3.0 |
|  | TMCPP | C-3 | 11.2 | 11.2 | 15.5 | 7.0 | 7.0 | 7.0 |
|  | HBB | C-4 | 4.8 | 4.8 | 6.6 | 3.0 | 3.0 | 3.0 |
|  | Zinc borate | C-5 | — | — | — | — | — | — |
|  | Antimony trioxide | C-6 | — | — | — | — | — | — |
|  | Aluminum hydroxide | C-7 | — | — | — | — | — | — |
|  | Diammonium hydrogen phosphate | C-8 | — | — | — | — | — | — |
|  | Aluminum phosphate monobasic | C-9 | — | — | — | — | — | — |
|  | Sodium phosphate monobasic | C-10 | — | — | — | — | — | — |
|  | Ammonium polyphosphate | C-11 | — | — | — | — | — | — |
|  | Phosphoric acid ester 1 | C-12 | — | — | — | — | — | — |

TABLE 8-continued

|  |  |  | Example 71 | Example 72 | Example 73 | Example 74 | Example 75 | Example 76 |
|---|---|---|---|---|---|---|---|---|
|  | Phosphoric acid ester 2 | C-13 | — | — | — | — | — | — |
|  | EBTBPI | C-14 | — | — | — | — | — | — |
|  | EBTBP | C-15 | — | — | — | — | — | — |
| Density (g/cm³) |  |  | 0.058 | 0.056 | 0.058 | 0.053 | 0.057 | 0.054 |
| Isocyanate INDEX |  |  | 550 | 250 | 270 | 400 | 400 | 400 |
| Gross calorific value (MJ/m²): after elapse of 10 minutes |  |  | 3.6 | 2.5 | 5.1 | 4.0 | 3.7 | 5.2 |
| Gross calorific value (MJ/m²): after elapse of 20 minutes |  |  | 4.5 | 5.3 | 8.3 | 5.7 | 5.6 | 6.5 |
| Gross calorific value |  |  | ◯◯ | ◯◯ | ◯ | ◯◯ | ◯◯ | ◯◯ |
| State of residue | Expansion |  | ◯ | ◯ | ◯ | ◯ | ◯ | ◯ |
|  | Deformation |  | ◯ | ◯ | ◯ | ◯ | ◯ | ◯ |
|  | Contraction |  | ◯ | ◯ | ◯ | ◯ | ◯ | ◯ |
| Determination |  |  | OK | OK | OK | OK | OK | OK |

Comparative Example 1

The test was performed in exactly the same manner as in Example 1, except that, compared to Example 1, the amount of the polyol compound A-1 used was changed to 52.7 parts by weight from 21.8 parts by weight in Example 1, the trimerization catalyst was not used, the amount of HFC used was changed to 6.4 parts by weight from 3.9 parts by weight, the amount of polyisocyanate used was changed to 47.3 parts by weight from 78.2 parts by weight in Example 1, and the additive was not used.

The results are shown in Table 9.

Comparative Example 2

The test was performed in exactly the same manner as in Example 1, except that, compared to Example 1, the amount of HFC used was changed to 3.2 parts by weight from 3.9 parts by weight, and the additive was not used.

The results are shown in Table 9.

Comparative Example 3

The test was performed in exactly the same manner as in Comparative example 2, except that, compared to Comparative example 2, the amount of HFC used was changed to 3.3 parts by weight from 3.2 parts by weight, and 3.0 parts by weight of red phosphorus was used.

The results are shown in Table 9.

Comparative Example 4

The test was performed in exactly the same manner as in Comparative example 2, except that, compared to Comparative example 2, the amount of HFC used was changed to 3.4 parts by weight from 3.2 parts by weight, and 6.0 parts by weight of red phosphorus was used.

The results are shown in Table 9.

Comparative Example 5

The test was performed in exactly the same manner as in Comparative example 2, except that, compared to Comparative example 2, the amount of HFC used was changed to 4.0 parts by weight from 3.2 parts by weight, and 12.0 parts by weight of red phosphorus was used.

The results are shown in Table 9.

Comparative Example 6

The test was performed in exactly the same manner as in Comparative example 2, except that, compared to Comparative example 2, the amount of HFC used was changed to 4.8 parts by weight from 3.2 parts by weight, and 24.0 parts by weight of red phosphorus was used.

The results are shown in Table 9.

Comparative Example 7

The test was performed in exactly the same manner as in Example 34, except that, compared to Example 34, the amount of the polyol compound A-1 used was changed to 25.0 parts by weight from 21.8 parts by weight in Example 34, the foaming agent was not used, the amount of HFC used was changed to 6.4 parts by weight from 4.7 parts by weight, and the amount of polyisocyanate used was changed to 75.0 parts by weight from 78.2 parts by weight in Example 34.

The results are shown in Table 9.

Comparative Example 8

The test was performed in exactly the same manner as in Example 34, except that, compared to Example 34, the amount of HFC used was changed to 4.4 parts by weight from 4.7 parts by weight, and red phosphorus was not used.

The results are shown in Table 9.

Comparative Example 9

The test was performed in exactly the same manner as in Comparative example 8, except that, compared to Comparative example 8, the amount of HFC used was changed to 4.5 parts by weight from 4.4 parts by weight, and 6.0 parts by weight of zinc borate was used instead of HBB.

The results are shown in Table 9.

Comparative Example 10

The test was performed in exactly the same manner as in Comparative example 8, except that, compared to Comparative example 8, the amount of HFC used was changed to 4.3 parts by weight from 4.4 parts by weight, and 6.0 parts by weight of zinc borate was used instead of TMCPP.

The results are shown in Table 9.

TABLE 9

|  |  |  | Comparative example 1 | Comparative example 2 | Comparative example 3 | Comparative example 4 | Comparative example 5 | Comparative example 6 | Comparative example 7 | Comparative example 8 | Comparative example 9 | Comparative example 10 |
|---|---|---|---|---|---|---|---|---|---|---|---|---|
| Polyol composition | Polyol compound | A-1 | 52.7 | 21.8 | 21.8 | 21.8 | 21.8 | 21.8 | 25.0 | 21.8 | 21.8 | 21.8 |
| | | A-2 | — | — | — | — | — | — | — | — | — | — |
| | | A-3 | — | — | — | — | — | — | — | — | — | — |
| | | A-4 | — | — | — | — | — | — | — | — | — | — |
| | | A-5 | — | — | — | — | — | — | — | — | — | — |
| | | A-6 | — | — | — | — | — | — | — | — | — | — |
| | | A-7 | — | — | — | — | — | — | — | — | — | — |
| | Foam stabilizer | | 1.7 | 1.7 | 1.7 | 1.7 | 1.7 | 1.7 | 1.7 | 1.7 | 1.7 | 1.7 |
| | Trimerization catalyst | B-1 | — | 0.5 | 0.5 | 0.5 | 0.5 | 0.5 | 0.5 | 0.5 | 0.5 | 0.5 |
| | | B-2 | — | 0.7 | 0.7 | 0.7 | 0.7 | 0.7 | 0.7 | 0.7 | 0.7 | 0.7 |
| | Urethanization catalyst | | 0.1 | 0.1 | 0.1 | 0.1 | 0.1 | 0.1 | 0.1 | 0.1 | 0.1 | 0.1 |
| | Foaming agent | Water | 0.6 | 0.6 | 0.6 | 0.6 | 0.6 | 0.6 | — | 0.6 | 0.6 | 0.6 |
| | | HFC | 6.4 | 3.2 | 3.3 | 3.4 | 4.0 | 4.8 | — | 4.4 | 4.5 | 4.3 |
| Polyisocyanate | | | 47.3 | 78.2 | 78.2 | 78.2 | 78.2 | 78.2 | 75.0 | 78.2 | 78.2 | 78.2 |
| Additive | Red phosphorus | C-1 | — | — | 3.0 | 6.0 | 12.0 | 24.0 | 6.0 | — | — | — |
| | Ammonium dihydrogen phosphate | C-2 | — | — | — | — | — | — | — | 3.0 | 3.0 | 3.0 |
| | TMCPP | C-3 | — | — | — | — | — | — | — | 7.0 | 7.0 | 7.0 |
| | HBB | C-4 | — | — | — | — | — | — | — | 3.0 | 3.0 | — | 3.0 |
| | Zinc borate | C-5 | — | — | — | — | — | — | — | — | — | 6.0 | 6.0 |
| | Antimony trioxide | C-6 | — | — | — | — | — | — | — | — | — | — |
| | Aluminum hydroxide | C-7 | — | — | — | — | — | — | — | — | ~ | — |
| Density (g/cm$^3$) | | | 0.060 | 0.058 | 0.056 | 0.053 | 0.057 | 0.056 | 0.314 | 0.055 | 0.053 | 0.052 |
| Isocyanate INDEX | | | 100 | 400 | 400 | 400 | 400 | 400 | 400 | 400 | 400 | 400 |
| Gross calorific value (MJ/m$^2$): after elapse of 10 minutes | | | 34.9 | 32.5 | 10.2 | 8.3 | 9.1 | 17.3 | 25.9 | 9.6 | 13.9 | 20.1 |
| Gross calorific value (MJ/m$^2$): after elapse of 20 minutes | | | 51.8 | 51.2 | 16.4 | 11.6 | 12.3 | 26.5 | 34.0 | 13.5 | 15.9 | 26.0 |
| Gross calorific value | | | X | X | X | X | X | X | X | X | X | X |
| State of residue | Expansion | | X | ○ | ○ | ○ | X | ○ | ○ | X | ○ | ○ |
| | Deformation | | X | X | ○ | ○ | ○ | X | X | X | X | X |
| | Contraction | | X | X | X | X | X | X | ○ | ○ | ○ | ○ |
| Determination | | | NG | NG | NG | NG | NG | NG | NG | NG | NG | NG |

Comparative Example 11

The test was performed in exactly the same manner as in Comparative example 9, except that, compared to Comparative example 9, 3.0 parts by weight of HBB was used instead of ammonium dihydrogen phosphate.

The results are shown in Table 10.

Comparative Example 12

The test was performed in exactly the same manner as in Example 1, except that, compared to Example 1, the amount of HFC used was changed to 3.7 parts by weight from 3.9 parts by weight, the amount of red phosphorus used was changed to 2.0 parts by weight from 3.0 parts by weight, and the amount of ammonium dihydrogen phosphate was changed to 1.0 parts by weight from 9.0 parts by weight.

The results are shown in Table 10.

Comparative Example 13

The test was performed in exactly the same manner as in Example 1, except that, compared to Example 1, the amount of HFC used was changed to 5.8 parts by weight from 3.9 parts by weight, the amount of red phosphorus used was changed to 24.0 parts by weight from 3.0 parts by weight, and the amount of ammonium dihydrogen phosphate was changed to 12.0 parts by weight from 9.0 parts by weight.

The results are shown in Table 10.

Comparative Example 14

The test was performed in exactly the same manner as in Example 1, except that, compared to Example 1, the amount of HFC used was changed to 4.6 parts by weight from 3.9 parts by weight, the amount of red phosphorus used was changed to 2.3 parts by weight from 3.0 parts by weight, and ammonium dihydrogen phosphate was replaced with 2.7 parts by weight of TMCPP.

The results are shown in Table 10.

Comparative Example 15

The test was performed in exactly the same manner as in Example 1, except that, compared to Example 1, the amount of HFC used was changed to 5.8 parts by weight from 3.9 parts by weight, the amount of red phosphorus used was changed to 18.5 parts by weight from 3.0 parts by weight, and ammonium dihydrogen phosphate was replaced with 21.5 parts by weight of TMCPP.

The results are shown in Table 10.

Comparative Example 16

The test was performed in exactly the same manner as in Example 1, except that, compared to Example 1, the amount of HFC used was changed to 5.8 parts by weight from 3.9 parts by weight, the amount of red phosphorus used was changed to 26.7 parts by weight from 3.0 parts by weight, and ammonium dihydrogen phosphate was replaced with 13.3 parts by weight of EBB.

The results are shown in Table 10.

Comparative Example 17

The test was performed in exactly the same manner as in Example 34, except that, compared to Example 34, the amount of HFC used was changed to 3.4 parts by weight from 4.7 parts by weight, the amount of red phosphorus used was changed to 1.6 parts by weight from 6.0 parts by weight, the amount of ammonium dihydrogen phosphate used was changed to 0.8 parts by weight from 3.0 parts by weight, the amount of TMCPP used was changed to 1.8 parts by weight from 7.0 parts by weight, and the amount of HBB used was changed to 0.8 parts by weight from 3.0 parts by weight.

The results are shown in Table 10.

Comparative Example 18

The test was performed in exactly the same manner as in Example 34, except that, compared to Example 34, the amount of the polyol compound A-1 used was changed to 52.7 parts by weight from 21.8 parts by weight in Example 34, the amount of HFC used was changed to 4.6 parts by weight from 4.7 parts by weight, and the amount of polyisocyanate used was changed to 47.3 parts by weight from 78.2 parts by weight in Example 34.

The results are shown in Table 10.

Comparative Example 19

The test was performed in exactly the same manner as in Example 34, except that, compared to Example 34, the amount of each of the trimerization catalysts B-1 and B-2 was changed to 0 parts by weight and 0.1 parts by weight respectively from 0.5 parts by weight and 0.7 parts by weight, and the amount of HFC used was changed to 4.6 parts by weight from 4.7 parts by weight.

The results are shown in Table 10.

Comparative Example 20

The test was performed in exactly the same manner as in Example 34, except that, compared to Example 34, the amount of each of the trimerization catalysts B-1 and B-2 was changed to 0.3 parts by weight and 0 parts by weight respectively from 0.5 parts by weight and 0.7 parts by weight, and the amount of HFC used was changed to 4.6 parts by weight from 4.7 parts by weight.

The results are shown in Table 10.

Comparative Example 21

The test was performed in exactly the same manner as in Example 34, except that, compared to Example 34, the amount of each of the trimerization catalysts B-1 and B-2 was changed to 0.2 parts by weight and 0.3 parts by weight respectively from 0.5 parts by weight and 0.7 parts by weight, and the amount of HFC used was changed to 4.6 parts by weight from 4.7 parts by weight.

The results are shown in Table 10.

TABLE 10

|  |  |  | Comparative example 11 | Comparative example 12 | Comparative example 13 | Comparative example 14 | Comparative example 15 | Comparative example 16 |
|---|---|---|---|---|---|---|---|---|
| Polyol composition | Polyol compound | A-1 | 21.8 | 21.8 | 21.8 | 21.8 | 21.8 | 21.8 |
|  |  | A-2 | — | — | — | — | — | — |
|  |  | A-3 | — | — | — | — | — | — |
|  |  | A-4 | — | — | — | — | — | — |
|  |  | A-5 | — | — | — | — | — | — |
|  |  | A-6 | — | — | — | — | — | — |
|  |  | A-7 | — | — | — | — | — | — |
|  | Foam stabilizer |  | 1.7 | 1.7 | 1.7 | 1.7 | 1.7 | 1.7 |
|  | Trimerization catalyst | B-1 | 0.5 | 0.5 | 0.5 | 0.5 | 0.5 | 0.5 |
|  |  | B-2 | 0.7 | 0.7 | 0.7 | 0.7 | 0.7 | 0.7 |
|  | Urethanization catalyst |  | 0.1 | 0.1 | 0.1 | 0.1 | 0.1 | 0.1 |
|  | Foaming agent | Water | 0.6 | 0.6 | 0.6 | 0.6 | 0.6 | 0.6 |
|  |  | HFC | 4.5 | 3.7 | 5.8 | 4.6 | 5.8 | 5.8 |
| Polyisocyanate |  |  | 78.2 | 78.2 | 78.2 | 78.2 | 78.2 | 78.2 |
| Additive | Red phosphorus | C-1 | — | 2.0 | 24.0 | 2.3 | 18.5 | 26.7 |
|  | Ammonium dihydrogen phosphate | C-2 | — | 1.0 | 12.0 | — | — | — |
|  | TMCPP | C-3 | 7.0 | — | — | 2.7 | 21.5 | — |
|  | HBB | C-4 | 3.0 | — | — | — | — | 13.3 |
|  | Zinc borate | C-5 | 6.0 | — | — | — | — | — |
|  | Antimony trioxide | C-6 | — | — | — | — | — | — |
|  | Aluminum hydroxide | C-7 | — | — | — | — | — | — |
| Density (g/cm$^3$) |  |  | 0.056 | 0.051 | 0.057 | 0.055 | 0.055 | 0.057 |
| Isocyanate INDEX |  |  | 400 | 400 | 400 | 400 | 400 | 400 |
| Gross calorific value (MJ/m$^2$): |  |  | 11.7 | 12.1 | 18.9 | 10.5 | 13.6 | 11.3 |

TABLE 10-continued

|  |  |  |  |  |  |  |  |
|---|---|---|---|---|---|---|---|
| after elapse of 10 minutes | | | | | | | |
| Gross calorific value (MJ/m$^2$): after elapse of 20 minutes | | 18.6 | 15.0 | 23.8 | 13.9 | 17.6 | 15.2 |
| Gross calorific value | | X | X | X | X | X | X |
| State of residue | Expansion | ○ | ○ | ○ | X | ○ | X |
|  | Deformation | X | X | X | X | X | X |
|  | Contraction | ○ | X | ○ | ○ | ○ | ○ |
| Determination | | NG | NG | NG | NG | NG | NG |

|  |  |  | Comparative example 17 | Comparative example 18 | Comparative example 19 | Comparative example 20 | Comparative example 21 |
|---|---|---|---|---|---|---|---|
| Polyol composition | Polyol compound | A-1 | 21.8 | 52.7 | 21.8 | 21.8 | 21.8 |
|  |  | A-2 | — | — | — | — | — |
|  |  | A-3 | — | — | — | — | — |
|  |  | A-4 | — | — | — | — | — |
|  |  | A-5 | — | — | — | — | — |
|  |  | A-6 | — | — | — | — | — |
|  |  | A-7 | — | — | — | — | — |
|  | Foam stabilizer |  | 1.7 | 1.7 | 1.7 | 1.7 | 1.7 |
|  | Trimerization catalyst | B-1 | 0.5 | 0.5 | 0.0 | 0.3 | 0.2 |
|  |  | B-2 | 0.7 | 0.7 | 0.1 | 0.0 | 0.3 |
|  | Urethanization catalyst |  | 0.1 | 0.1 | 0.1 | 0.1 | 0.1 |
|  | Foaming agent | Water | 0.6 | 0.6 | 0.6 | 0.6 | 0.6 |
|  |  | HFC | 3.4 | 4.6 | 4.6 | 4.6 | 4.6 |
| Polyisocyanate |  |  | 78.2 | 47.3 | 78.2 | 78.2 | 78.2 |
| Additive | Red phosphorus | C-1 | 1.6 | 6.0 | 6.0 | 6.0 | 6.0 |
|  | Ammonium dihydrogen phosphate | C-2 | 0.8 | 3.0 | 3.0 | 3.0 | 3.0 |
|  | TMCPP | C-3 | 1.8 | 7.0 | 7.0 | 7.0 | 7.0 |
|  | HBB | C-4 | 0.8 | 3.0 | 3.0 | 3.0 | 3.0 |
|  | Zinc borate | C-5 | — | — | — | — | — |
|  | Antimony trioxide | C-6 | — | — | — | — | — |
|  | Aluminum hydroxide | C-7 | — | — | — | — | — |
| Density (g/cm$^3$) |  |  | 0.052 | 0.053 | Unfoamable | Unfoamable | 0.053 |
| Isocyanate INDEX |  |  | 400 | 100 | 400 | 400 | 400 |
| Gross calorific value (MJ/m$^2$): after elapse of 10 minutes |  |  | 12.0 | 8.1 | — | — | 14.1 |
| Gross calorific value (MJ/m$^2$): after elapse of 20 minutes |  |  | 15.6 | 10.8 | — | — | 17.9 |
| Gross calorific value |  |  | X | X | — | — | X |
| State of residue | Expansion |  | X | X | — | — | X |
|  | Deformation |  | X | ○ | — | — | ○ |
|  | Contraction |  | ○ | ○ | — | — | X |
| Determination |  |  | NG | NG | — | — | NG |

The molded article obtained from the flame-retardant urethane resin composition according to one or more embodiments of the present disclosure yields a small calorific value when it combusts, and the residue thereof remaining after combustion maintains a constant shape. Therefore, the molded article can exhibit excellent fireproof properties.

Because the molded article formed of the flame-retardant urethane resin composition according to one or more embodiments of the present disclosure has excellent fireproof properties, the flame-retardant urethane resin composition of one or more embodiments of the present disclosure can be widely applied to buildings and the like.

Although embodiments of the disclosure have been described using specific terms, devices, and methods, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. Therefore, the spirit and scope of the appended claims should not be limited to the description of the preferred versions contained therein.

What is claimed is:

1. A flame retarding composition, comprising
a urethane resin prepared from a composition comprising:
    a polyisocyanate compound;
    a polyol compound;
    a trimerization catalyst;
    a foaming agent;
    a foam stabilizer; and
    an additive, wherein
    the trimerization catalyst is at least one selected from the group consisting of a nitrogen-containing aromatic compound, a carboxylic acid alkali metal salt, a tertiary ammonium salt, and a quaternary ammonium salt,
    the additive comprises red phosphorus and a bromine-containing flame retardant,
    the bromine-containing flame retardant is at least one selected from the group consisting of hexabromobiphenyl and decabromobiphenyl, an amount of the red phosphorus is within a range of 3 parts by weight to 18 parts by weight based on 100 parts by weight of the urethane resin, an amount of the trimerization catalyst is within a range of 0.6 parts by weight to 10 parts by weight based on 100 parts by weight of the urethane resin, and an isocyanate index of the urethane resin is 400 to 1,000.

2. The flame retarding composition according to claim 1, wherein an amount of the additive is within a range of 4.5 parts by weight to 70 parts by weight based on 100 parts by weight of the urethane resin.

3. The flame retarding composition according to claim 1, wherein an amount of the foaming agent is within a range of 0.1 parts by weight to 30 parts by weight based on 100 parts by weight of the urethane resin.

4. A method for producing a flame retarding composition comprising:

preparing an additive by mixing red phosphorus and a bromine-containing flame retardant;

preparing a mixture by mixing a polyol compound, a trimerization catalyst, a foaming agent, a foam stabilizer, and the additive; and adding a polyisocyanate compound into the mixture to form a urethane resin, wherein the trimerization catalyst is at least one selected from the group consisting of a nitrogen-containing aromatic compound, a carboxylic acid alkali metal salt, a tertiary ammonium salt, and a quaternary ammonium salt, the bromine-containing flame retardant is at least one selected from the group consisting of hexabromobiphenyl and decabromobiphenyl, an amount of the red phosphorus is within a range of 3 parts by weight to 18 parts by weight based on 100 parts by weight of the urethane resin, an amount of the trimerization catalyst is within a range of 0.6 parts by weight to 10 parts by weight based on 100 parts by weight of the urethane resin, and an isocyanate index of the urethane resin is 400 to 1,000.

5. The method for producing a flame retarding composition according to claim 4, wherein an amount of the additive is within a range of 4.5 parts by weight to 70 parts by weight based on 100 parts by weight of the urethane resin.

6. The method for producing a flame retarding composition according to claim 4, wherein an amount of the foaming agent is within a range of 0.1 parts by weight to 30 parts by weight based on 100 parts by weight of the urethane resin.

7. The flame retarding composition according to claim 1, wherein the additive further comprises a phosphoric acid ester.

8. The method for producing a flame retarding composition according to claim 4, wherein preparing the additive further comprises mixing a phosphoric acid ester with the red phosphorus and the bromine-containing flame retardant.

* * * * *